(12) United States Patent
Hannuksela et al.

(10) Patent No.: US 8,335,265 B2
(45) Date of Patent: Dec. 18, 2012

(54) PICTURE DECODING METHOD

(75) Inventors: Miska Hannuksela, Ruutana (FI); Emre Aksu, Tampere (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 12/924,456

(22) Filed: Sep. 27, 2010

(65) Prior Publication Data

US 2011/0019747 A1 Jan. 27, 2011

Related U.S. Application Data

(63) Continuation of application No. 11/057,065, filed on Feb. 11, 2005, now abandoned.

(60) Provisional application No. 60/544,598, filed on Feb. 13, 2004.

(51) Int. Cl.
*H04N 7/12* (2006.01)

(52) U.S. Cl. .............. 375/240.25; 375/240.01

(58) Field of Classification Search .......... 375/240, 375/240.01, 240.12, 240.25; 341/51
See application file for complete search history.

(56) References Cited

U.S. PATENT DOCUMENTS

| | | | |
|---|---|---|---|
| 5,122,875 A | 6/1992 | Raychaudhuri et al. | |
| 5,387,941 A | 2/1995 | Montgomery et al. | |
| 5,398,072 A | 3/1995 | Auld | |
| 5,467,173 A | 11/1995 | Sakata et al. | |
| 5,481,543 A | 1/1996 | Veltman | |
| 5,486,864 A | 1/1996 | Zdepski | |
| 5,517,250 A | 5/1996 | Hoogenboom et al. | |
| 5,677,905 A | 10/1997 | Bigham et al. | |
| 5,719,632 A | 2/1998 | Hoang et al. | |
| 5,815,600 A | 9/1998 | Sano et al. | |
| 5,822,024 A | 10/1998 | Setogawa et al. | |
| 5,877,812 A * | 3/1999 | Krause et al. | 375/240.25 |
| 5,892,924 A | 4/1999 | Lyon et al. | |
| 6,011,590 A | 1/2000 | Saukkonen | |
| 6,023,233 A * | 2/2000 | Craven et al. | 341/51 |
| 6,141,785 A | 10/2000 | Hur et al. | |
| 6,188,700 B1 | 2/2001 | Kato et al. | |
| 6,269,080 B1 | 7/2001 | Kumar | |
| 6,289,129 B1 | 9/2001 | Chen et al. | |

(Continued)

FOREIGN PATENT DOCUMENTS

CN 1279856 1/2001

(Continued)

OTHER PUBLICATIONS

S. Wenger et al; "RTP Payload Format for H.264 Video"; Internet Draft draft-ietf-avt-rtp-h264-04.txt; Feb. 10, 2004; URL, http://www.ietf.org/proceedings/59/I-D/draft-ietf-avt-rtp-h264-04.txt, see section 1.1, 6.4, 7.2.*

(Continued)

*Primary Examiner* — Allen Wong
(74) *Attorney, Agent, or Firm* — Alston & Bird LLP

(57) ABSTRACT

The invention relates to method for buffering encoded pictures. The method includes an encoding step for forming encoded pictures in an encoder. The method also includes a transmission step for transmitting said encoded pictures to a decoder as transmission units, a buffering step for buffering transmission units transmitted to the decoder in a buffer, and a decoding step for decoding the encoded pictures for forming decoded pictures. The buffer size is defined so that the total size of at least two transmission units is defined and the maximum buffer size is defined on the basis of the total size.

12 Claims, 11 Drawing Sheets

U.S. PATENT DOCUMENTS

| | | | |
|---|---|---|---|
| 6,493,388 | B1 | 12/2002 | Wang |
| 6,496,980 | B1 | 12/2002 | Tillman et al. |
| 6,526,022 | B1 | 2/2003 | Chiu et al. |
| 6,618,438 | B1 | 9/2003 | Le Roux et al. |
| 6,625,320 | B1 | 9/2003 | Nilsson et al. |
| 6,628,719 | B1 | 9/2003 | Kono et al. |
| 6,697,426 | B1 * | 2/2004 | Van Der Schaar et al. .............. 375/240.01 |
| 6,754,275 | B1 | 6/2004 | Yasuda et al. |
| 6,782,490 | B2 | 8/2004 | Maxemchuk et al. |
| 6,873,786 | B2 | 3/2005 | Lin et al. |
| 6,950,466 | B2 | 9/2005 | Kim et al. |
| 7,072,404 | B2 | 7/2006 | Itokawa |
| 7,289,500 | B1 | 10/2007 | Amlekar |
| 7,296,205 | B2 | 11/2007 | Curcio et al. |
| 7,301,944 | B1 | 11/2007 | Redmond |
| 7,356,079 | B2 | 4/2008 | Laksono et al. |
| 7,526,523 | B2 | 4/2009 | Nekovee et al. |
| 7,551,672 | B1 | 6/2009 | Tahara et al. |
| 7,809,240 | B2 | 10/2010 | Nomura |
| 8,108,747 | B2 | 1/2012 | Curcio et al. |
| 8,160,134 | B2 | 4/2012 | Tahara et al. |
| 2001/0049291 | A1 | 12/2001 | Sato et al. |
| 2002/0003799 | A1 | 1/2002 | Tomita |
| 2002/0004840 | A1 | 1/2002 | Harumoto et al. |
| 2002/0071485 | A1 | 6/2002 | Caglar et al. |
| 2002/0095636 | A1 | 7/2002 | Tatsumi et al. |
| 2002/0105951 | A1 | 8/2002 | Hannuksela et al. |
| 2002/0174442 | A1 | 11/2002 | Nomura |
| 2003/0031175 | A1 | 2/2003 | Hayashi et al. |
| 2003/0135784 | A1 | 7/2003 | Yamaguchi et al. |
| 2003/0138043 | A1 | 7/2003 | Hannuksela |
| 2003/0142689 | A1 | 7/2003 | Haberman et al. |
| 2003/0169815 | A1 | 9/2003 | Aggarwal et al. |
| 2004/0005007 | A1 | 1/2004 | Viscito et al. |
| 2004/0010802 | A1 | 1/2004 | Visharam et al. |
| 2004/0039796 | A1 | 2/2004 | Watkins |
| 2004/0205071 | A1 | 10/2004 | Uesugi et al. |
| 2004/0223551 | A1 | 11/2004 | Hannuksela |
| 2004/0228413 | A1 | 11/2004 | Hannuksela |
| 2005/0123055 | A1 | 6/2005 | Winger |
| 2005/0201471 | A1 | 9/2005 | Hannuksela |
| 2006/0072597 | A1 | 4/2006 | Hannuksela |

FOREIGN PATENT DOCUMENTS

| | | |
|---|---|---|
| CN | 1280743 | 1/2001 |
| CN | 1280753 A | 1/2001 |
| CN | 1358388 | 7/2002 |
| EP | 0944269 | 9/1999 |
| EP | 0949819 | 10/1999 |
| EP | 0981249 | 2/2000 |
| EP | 1 069 777 A1 | 1/2001 |
| EP | 1185033 A1 | 3/2002 |
| EP | 1379085 | 1/2004 |
| EP | 1146683 | 10/2011 |
| GB | 2287383 A | 9/1995 |
| JP | 2001045020 A | 2/2001 |
| JP | 2001298407 A | 10/2001 |
| JP | 2002112265 | 4/2002 |
| JP | 2002330379 | 11/2002 |
| JP | 2002359641 A | 12/2002 |
| JP | 2003008642 A | 1/2003 |
| RU | 2115261 | 7/1998 |
| RU | 2189072 | 9/2002 |
| WO | WO 96/20575 | 7/1996 |
| WO | WO-97/28505 A1 | 8/1997 |
| WO | WO-99/16225 A1 | 4/1999 |
| WO | WO 00/46995 A1 | 8/2000 |
| WO | WO-00/67469 A1 | 11/2000 |
| WO | WO 2004/019530 | 3/2004 |
| WO | WO 2004/075555 | 9/2004 |

OTHER PUBLICATIONS

International Search Report; Appl. No. PCT/FI2004/050015; dated Jun. 21, 2004; 3 pages.
Chinese Office Action with English translation; Appl. No. 200480004447.0; dated Mar. 7, 2008; 23 pages.
Mexican Office Action with English translation; Appl. No. PA/a/2005/008405; dated May 23, 2008; 11 pages.
International Search Report; Appl. No. PCT/FI2004/050016; dated Jun. 14, 2004; 4 pages.
Chinese Office Action with English translation; Appl. No. 200480004552.4; dated Mar. 7, 2008; 40 pages.
Mexican Office Action with English translation; Appl. No. PA/a/2005/008404; dated May 9, 2008; 8 pages.
Canadian Office Action; Appl. No. 2,515,354; dated Jul. 15, 2009; 5 pages.
Russian Notice of Allowance with English translation; Appl. No. 2005129107/09(032663); dated Jun. 5, 2009; 18 pages.
Russian Office Action (English translation); Appl. No. 2006128854/09; dated Oct. 16, 2008; 4 pages.
Russian Notice of Allowance with English translation; Appl. No. 2006128854/09; dated Oct. 1, 2009; 12 pages.
Japanese Office Action with English translation; Appl. No. 2006-552649; dated Nov. 24, 2009; 8 pages.
Singapore Search Report; Appl. No. SG200605400-1; dated Jun. 25, 2008, 19 pages.
Canadian Office Action; Appl. No. 2,555,282; dated Jul. 15, 2010; 4 pages.
International Search Report; Appl. No. PCT/FI2005/050032; dated Jun. 8, 2005; 4 pages.
S. Wenger, et al; "RTP Payload Format for H.264 Video"; Internet Draft draft-ietf-avt-rtp-h264-04.txt; Feb. 10, 2004; URL: http://www.ietf.org/proceedings/59/I-D/draft-ieff-avt-rtp-h264-04.txt; sections 1.1, 6.4, 7.2.
Wei-qiang Wang; "An Index Model for mPEG-2 Streams and Its Application"; 2001 Journal of Software, vol. 12, No. 8; 1000-9825/2001/12(08) 1212-08; pp. 1212-1219 (see English Abstract attached).
Joint Video Team (JVT) of ISO/IEC MPEG and ITU-T VCEG; "HRD Editor's Input to Final Committee Draft (FCD) of Joint Video Specification (ITU-T Rec. H.264 ISO/IEC 14496-10 AVC) regarding Hypothetical Reference Decoder"; Draft ISO/IEC 14496-10; Document JVT-D146; 4th Meeting, Lagenfurt, Austria, Jul. 22-26, 2001 (whole document).
Joint Video Team (JVT) of ISO/IEC MPEG & ITU-T VCEG, Study o Final Committee Draft of Joint Video Specification, JVT-F100, 6th Meeting: Awaji, Island, JP, Dec. 5-13, 2002; pp. 169, 170, 176-178, and 182).
Wenger, et al; "RTP Payload Format for H.264 Video; draft-ietf-avt-rtp-h264-02.txt"; IETF Standard-Working-Draft, Internet Engineering Task Force, IETF, CH; vol. Avt, No. 2, Jun. 26, 2003, XP015001402, ISSN: 0000-0004; whole document.
Wenger, et al; "RTP Payload Format for H.264 Video; draft-ietf-avt-rtp-h264-02.txt"; IETF Standard-Working-Draft, Internet Engineering Task Force, IETF, CH; vol. Avt, No. 2, Jul. 2, 2003, XP015001402, ISSN: 0000-0004; whole document.
Hannuksela; "Signaling of Enhanced GOPs"; IITU Study Group 16—Video Coding Experts Group—ISO/IEC MPEG & ITU-T VCEG (ISO/IEC JTC1/SC29/WG11 and ITU-T SG16 Q6); No. JVT-D093, Jul. 26, 2002; whole document.
Hannuksela; "On NAL Unit Order"; ITU Study Group 16—Video Coding Experts Group—ISO/IEC MPEG & ITU-T VCEG (ISO/IEC JTC1/SC29/WG11 and ITU-T SG16 Q1); No. JVT-D093; Jul. 26, 2002; whole document.
Gary Sullivan; "Q.6/16 Report of Activities at Interim Meetings in Klagenfurt, Austria, May 6-10, 2002; TD 10"; ITU-T Draft Study Period 2001-2004; International Telecommunication Union, Geneva; CH, vol. Study Group 16; pp. 1-75.
S. Wenger, et al; "RTP Payload Format for H.264 Video"; Internet Draft draft-ietf-avt-rtp-h264-04.txt; Feb. 17, 2004; URL: http://www.ietf. org/proceedings/59/I-D/draft-ietf-avt-rtp-h264-04.txt; sections 1.1, 6.4, 7.2.
J. Van Der Meer, et al (Philips Electronics); Draft—IETF-AVT-MPEG4-SIMPLE-07.TXT; RTP Payload Format for Transport of MPEG-4 Elementary Streams; Feb. 1, 2003; pp. 1-41.
Adamson et al., "NACK-Oriented Reliable Multicast Protocol (NORM)," Internet Draft, Jan. 2004, 67 pages.
International Search Report and Written Opinion from International Appl. No. PCT/FI2005/050033, dated May 25, 2005.

Luby et al., "Asynchronous Layered Coding (ALC) Protocol Instantiation," RFC 3450, Dec. 2002, 30 pages.

Luby et al., "Forward Error Correction (FEC) Building Block," RFC 3452, Dec. 2002, 15 pages.

Office Action from Canadian Patent Appl. No. 2,556,120 mailed Aug. 20, 2010.

Office Action from Japanese Appl. No. 2006-552650, dated Oct. 23, 2009.

Paila et al., "FLUTE-File Delivery over Unidirectional Transport," Internet Draft, Dec. 2003, 28 pages.

Wenger et al., "RTP Payload Format for H.264 Video," draft-ietf-avt-rtp-h264-11.txt, Aug. 2004.

Wenger et al., "RTP Payload Format for JVT Video," Internet Draft draft-ietf-avt-rtp-h264-01.txt, Mar. 1, 2003, 14 pages.

Written Opinion from Singapore Application No. SG-2006-05400-1, dated Jul. 30, 2008.

U.S. Appl. No. 60/483,159, filed Jun. 27, 2003.

"Information Technology Vocabulary. Fundamental Terms," ISO/IEC 2382-1:1993, <www.mprepc.ru/informatisation/iso2381-1.html>, Feb. 15, 1994.

3GPP TS 23.246, V.6.1.0 (Dec. 2003), Technical Specification, 3rd Generation Partnership Project; Technical Specification Group Services and System Aspects; Multimedia Broadcast/Multicast Service (MBMS); Architecture and Functional Description (Release 6), 38 pages.

Office Action from EP Appl. No. 04711624.9, dated Mar. 9, 2011.

Stockhammer et al., "H.264/AVC in Wireless Environments," *IEEE Transactions on Circuits and Systems for Video Technology*, vol. 13, No. 7, Jul. 2003, pp. 657-673.

Stockhammer et al., "H.264/JVT Coding Network Abstraction Layer and IP-Based Transport," *Proceedings of the IEEE 2002 International Conference on Image Processing*, Sep. 22-25, 2002, vol. 2, pp. II-485-II-488.

Wang et al., "System and Transport Interface of SVC," *IEEE Transactions on Circuits and Systems for Video Technology*, vol. 17, No. 9, Sep. 2007, pp. 1149-1163.

Wenger et al., "RTP Payload Format for H.264 Video," Internet Draft draft-ietf-avt-rtp-h264-03.txt, IETF Standard-Working-Draft, Internet Engineering Task Force, IETF, CH, vol. Avt, No. 3, Oct. 2003.

Office Action for European Application No. 05 708 200.0 dated Mar. 23, 2011.

Office Action for European Application No. 04 711 623.1 dated Mar. 7, 2012.

Joint Video Team (JVT) of ISO/IEC MPEG & ITU-T VCEG (ISO/IEC JTC1/SC29/WG11 and ITU-T SG16 Q.6), 3$^{rd}$ Meeting, Fairfax, VA, USA May 2002, 13 pages.

Wenger, S. et al., *RTP Payload Format for JVT Video, draft-ietf-avt-rtp-h264-00.txt*, Sep. 2002, 16 pages.

Office Action for U.S. Appl. No. 10/782,372 dated Jul. 18, 2012.

Office Action from Japanese Patent Application No. 2009-141863, mailed Oct. 10, 2012.

\* cited by examiner

Three-layer recursive temporal scalability

Decoding of two layers from the three-layer sequence above

PICTURE DECODING METHOD

CROSS REFERENCE TO RELATED APPLICATIONS

This application is a continuation of application Ser. No. 11/057,065 filed on Feb. 11, 2005 now abandoned and is claiming domestic priority under all applicable sections of 35 U.S.C. §120, which in turn claims the benefit of U.S. provisional patent application 60/544,598 filed on Feb. 13, 2004.

FIELD OF THE INVENTION

The present invention relates to a method for buffering encoded pictures, the method including an encoding step for forming encoded pictures in an encoder, a transmission step for transmitting said encoded pictures to a decoder, a decoding step for decoding the encoded pictures for forming decoded pictures, and rearranging step for arranging the decoded pictures in decoding order. The invention also relates to a system, transmitting device, receiving device, an encoder, a decoder, an electronic device, a software program, and a storage medium.

BACKGROUND OF THE INVENTION

Published video coding standards include ITU-T H.261, ITU-T H.263, ISO/IEC MPEG-1, ISO/IEC MPEG-2, and ISO/IEC MPEG-4 Part 2. These standards are herein referred to as conventional video coding standards.
Video Communication Systems Video communication systems can be divided into conversational and non-conversational systems. Conversational systems include video conferencing and video telephony. Examples of such systems include ITU-T Recommendations H.320, H.323, and H.324 that specify a video conferencing/telephony system operating in ISDN, IP, and PSTN networks respectively. Conversational systems are characterized by the intent to minimize the end-to-end delay (from audio-video capture to the far-end audio-video presentation) in order to improve the user experience.

Non-conversational systems include playback of stored content, such as Digital Versatile Disks (DVDs) or video files stored in a mass memory of a playback device, digital TV, and streaming. A short review of the most important standards in these technology areas is given below.

A dominant standard in digital video consumer electronics today is MPEG-2, which includes specifications for video compression, audio compression, storage, and transport. The storage and transport of coded video is based on the concept of an elementary stream. An elementary stream consists of coded data from a single source (e.g. video) plus ancillary data needed for synchronization, identification and characterization of the source information. An elementary stream is packetized into either constant-length or variable-length packets to form a Packetized Elementary Stream (PES). Each PES packet consists of a header followed by stream data called the payload. PES packets from various elementary streams are combined to form either a Program Stream (PS) or a Transport Stream (TS). PS is aimed at applications having negligible transmission errors, such as store-and-play type of applications. TS is aimed at applications that are susceptible of transmission errors. However, TS assumes that the network throughput is guaranteed to be constant.

There is a standardization effort going on in a Joint Video Team (JVT) of ITU-T and ISO/IEC. The work of JVT is based on an earlier standardization project in ITU-T called H.26L. The goal of the JVT standardization is to release the same standard text as ITU-T Recommendation H.264 and ISO/IEC International Standard 14496-10 (MPEG-4 Part 10). The draft standard is referred to as the JVT coding standard in this paper, and the codec according to the draft standard is referred to as the JVT codec.

The codec specification itself distinguishes conceptually between a video coding layer (VCL), and a network abstraction layer (NAL). The VCL contains the signal processing functionality of the codec, things such as transform, quantization, motion search/compensation, and the loop filter. It follows the general concept of most of today's video codecs, a macroblock-based coder that utilizes inter picture prediction with motion compensation, and transform coding of the residual signal. The output of the VCL are slices: a bit string that contains the macroblock data of an integer number of macroblocks, and the information of the slice header (containing the spatial address of the first macroblock in the slice, the initial quantization parameter, and similar). Macroblocks in slices are ordered in scan order unless a different macroblock allocation is specified, using the so-called Flexible Macroblock Ordering syntax. In-picture prediction is used only within a slice.

The NAL encapsulates the slice output of the VCL into Network Abstraction Layer Units (NALUs), which are suitable for the transmission over packet networks or the use in packet oriented multiplex environments. JVT's Annex B defines an encapsulation process to transmit such NALUs over byte-stream oriented networks.

The optional reference picture selection mode of H.263 and the NEWPRED coding tool of MPEG-4 Part 2 enable selection of the reference frame for motion compensation per each picture segment, e.g., per each slice in H.263. Furthermore, the optional Enhanced Reference Picture Selection mode of H.263 and the JVT coding standard enable selection of the reference frame for each macroblock separately.

Reference picture selection enables many types of temporal scalability schemes. FIG. 1 shows an example of a temporal scalability scheme, which is herein referred to as recursive temporal scalability. The example scheme can be decoded with three constant frame rates. FIG. 2 depicts a scheme referred to as Video Redundancy Coding, where a sequence of pictures is divided into two or more independently coded threads in an interleaved manner. The arrows in these and all the subsequent figures indicate the direction of motion compensation and the values under the frames correspond to the relative capturing and displaying times of the frames.
Parameter Set Concept One very fundamental design concept of the JVT codec is to generate self-contained packets, to make mechanisms such as the header duplication unnecessary. The way how this was achieved is to decouple information that is relevant to more than one slice from the media stream. This higher layer meta information should be sent reliably, asynchronously and in advance from the RTP packet stream that contains the slice packets. This information can also be sent in-band in such applications that do not have an out-of-band transport channel appropriate for the purpose. The combination of the higher level parameters is called a Parameter Set. The Parameter Set contains information such as picture size, display window, optional coding modes employed, macroblock allocation map, and others.

In order to be able to change picture parameters (such as the picture size), without having the need to transmit Parameter Set updates synchronously to the slice packet stream, the encoder and decoder can maintain a list of more than one Parameter Set. Each slice header contains a codeword that indicates the Parameter Set to be used.

This mechanism allows to decouple the transmission of the Parameter Sets from the packet stream, and transmit them by external means, e.g. as a side effect of the capability exchange, or through a (reliable or unreliable) control protocol. It may even be possible that they get never transmitted but are fixed by an application design specification.

Transmission Order

In conventional video coding standards, the decoding order of pictures is the same as the display order except for B pictures. A block in a conventional B picture can be bi-directionally temporally predicted from two reference pictures, where one reference picture is temporally preceding and the other reference picture is temporally succeeding in display order. Only the latest reference picture in decoding order can succeed the B picture in display order (exception: interlaced coding in H.263 where both field pictures of a temporally subsequent reference frame can precede a B picture in decoding order). A conventional B picture cannot be used as a reference picture for temporal prediction, and therefore a conventional B picture can be disposed without affecting the decoding of any other pictures.

The JVT coding standard includes the following novel technical features compared to earlier standards:
- The decoding order of pictures is decoupled from the display order. The picture number indicates decoding order and the picture order count indicates the display order.
- Reference pictures for a block in a B picture can either be before or after the B picture in display order. Consequently, a B picture stands for a bi-predictive picture instead of a bi-directional picture.
- Pictures that are not used as reference pictures are marked explicitly. A picture of any type (intra, inter, B, etc.) can either be a reference picture or a non-reference picture. (Thus, a B picture can be used as a reference picture for temporal prediction of other pictures.)
- A picture can contain slices that are coded with a different coding type. In other words, a coded picture may consist of an intra-coded slice and a B-coded slice, for example.

Decoupling of display order from decoding order can be beneficial from compression efficiency and error resiliency point of view.

An example of a prediction structure potentially improving compression efficiency is presented in FIG. 3. Boxes indicate pictures, capital letters within boxes indicate coding types, numbers within boxes are picture numbers according to the JVT coding standard, and arrows indicate prediction dependencies. Note that picture B17 is a reference picture for pictures B18. Compression efficiency is potentially improved compared to conventional coding, because the reference pictures for pictures B18 are temporally closer compared to conventional coding with PBBP or PBBBP coded picture patterns. Compression efficiency is potentially improved compared to conventional PBP coded picture pattern, because part of reference pictures are bi-directionally predicted.

FIG. 4 presents an example of the intra picture postponement method that can be used to improve error resiliency. Conventionally, an intra picture is coded immediately after a scene cut or as a response to an expired intra picture refresh period, for example. In the intra picture postponement method, an intra picture is not coded immediately after a need to code an intra picture arises, but rather a temporally subsequent picture is selected as an intra picture. Each picture between the coded intra picture and the conventional location of an intra picture is predicted from the next temporally subsequent picture. As FIG. 4 shows, the intra picture postponement method generates two independent inter picture prediction chains, whereas conventional coding algorithms produce a single inter picture chain. It is intuitively clear that the two-chain approach is more robust against erasure errors than the one-chain conventional approach. If one chain suffers from a packet loss, the other chain may still be correctly received. In conventional coding, a packet loss always causes error propagation to the rest of the inter picture prediction chain.

Two types of ordering and timing information have been conventionally associated with digital video: decoding and presentation order. A closer look at the related technology is taken below.

A decoding timestamp (DTS) indicates the time relative to a reference clock that a coded data unit is supposed to be decoded. If DTS is coded and transmitted, it serves for two purposes: First, if the decoding order of pictures differs from their output order, DTS indicates the decoding order explicitly. Second, DTS guarantees a certain pre-decoder buffering behavior provided that the reception rate is close to the transmission rate at any moment. In networks where the end-to-end latency varies, the second use of DTS plays no or little role. Instead, received data is decoded as fast as possible provided that there is room in the post-decoder buffer for uncompressed pictures.

Carriage of DTS depends on the communication system and video coding standard in use. In MPEG-2 Systems, DTS can optionally be transmitted as one item in the header of a PES packet. In the JVT coding standard, DTS can optionally be carried as a part of Supplemental Enhancement Information (SEI), and it is used in the operation of the optional Hypothetical Reference Decoder. In ISO Base Media File Format, DTS is dedicated its own box type, Decoding Time to Sample Box. In many systems, such as RTP-based streaming systems, DTS is not carried at all, because decoding order is assumed to be the same as transmission order and exact decoding time does not play an important role.

H.263 optional Annex U and Annex W.6.12 specify a picture number that is incremented by 1 relative to the previous reference picture in decoding order. In the JVT coding standard, the frame number coding element is specified similarly to the picture number of H.263. The JVT coding standard specifies a particular type of an intra picture, called an instantaneous decoder refresh (IDR) picture. No subsequent picture can refer to pictures that are earlier than the IDR picture in decoding order. An IDR picture is often coded as a response to a scene change. In the JVT coding standard, frame number is reset to 0 at an IDR picture in order to improve error resilience in case of a loss of the IDR picture as is presented in FIGS. 5a and 5b. However, it should be noted that the scene information SEI message of the JVT coding standard can also be used for detecting scene changes.

H.263 picture number can be used to recover the decoding order of reference pictures. Similarly, the JVT frame number can be used to recover the decoding order of frames between an IDR picture (inclusive) and the next IDR picture (exclusive) in decoding order. However, because the complementary reference field pairs (consecutive pictures coded as fields that are of different parity) share the same frame number, their decoding order cannot be reconstructed from the frame numbers.

The H.263 picture number or JVT frame number of a non-reference picture is specified to be equal to the picture or frame number of the previous reference picture in decoding order plus 1. If several non-reference pictures are consecutive in decoding order, they share the same picture or frame number. The picture or frame number of a non-reference picture is also the same as the picture or frame number of the following reference picture in decoding order. The decoding order of consecutive non-reference pictures can be recovered using the Temporal Reference (TR) coding element in H.263 or the Picture Order Count (POC) concept of the JVT coding standard.

A presentation timestamp (PTS) indicates the time relative to a reference clock when a picture is supposed to be displayed. A presentation timestamp is also called a display timestamp, output timestamp, and composition timestamp.

Carriage of PTS depends on the communication system and video coding standard in use. In MPEG-2 Systems, PTS can optionally be transmitted as one item in the header of a PES packet. In the JVT coding standard, PTS can optionally be carried as a part of Supplemental Enhancement Information (SEI), and it is used in the operation of the Hypothetical Reference Decoder. In ISO Base Media File Format, PTS is dedicated its own box type, Composition Time to Sample Box where the presentation timestamp is coded relative to the corresponding decoding timestamp. In RTP, the RTP timestamp in the RTP packet header corresponds to PTS.

Conventional video coding standards feature the Temporal Reference (TR) coding element that is similar to PTS in many aspects. In some of the conventional coding standards, such as MPEG-2 video, TR is reset to zero at the beginning of a Group of Pictures (GOP). In the JVT coding standard, there is no concept of time in the video coding layer. The Picture Order Count (POC) is specified for each frame and field and it is used similarly to TR in direct temporal prediction of B slices, for example. POC is reset to 0 at an IDR picture.

Transmission of Multimedia Streams

A multimedia streaming system consists of a streaming server and a number of players, which access the server via a network. The network is typically packet-oriented and provides little or no means to guaranteed quality of service. The players fetch either pre-stored or live multimedia content from the server and play it back in real-time while the content is being downloaded. The type of communication can be either point-to-point or multicast. In point-to-point streaming, the server provides a separate connection for each player. In multicast streaming, the server transmits a single data stream to a number of players, and network elements duplicate the stream only if it is necessary.

When a player has established a connection to a server and requested for a multimedia stream, the server begins to transmit the desired stream. The player does not start playing the stream back immediately, but rather it typically buffers the incoming data for a few seconds. Herein, this buffering is referred to as initial buffering. Initial buffering helps to maintain pauseless playback, because, in case of occasional increased transmission delays or network throughput drops, the player can decode and play buffered data.

In order to avoid unlimited transmission delay, it is uncommon to favor reliable transport protocols in streaming systems. Instead, the systems prefer unreliable transport protocols, such as UDP, which, on one hand, inherit a more stable transmission delay, but, on the other hand, also suffer from data corruption or loss.

RTP and RTCP protocols can be used on top of UDP to control real-time communications. RTP provides means to detect losses of transmission packets, to reassemble the correct order of packets in the receiving end, and to associate a sampling time-stamp with each packet. RTCP conveys information about how large a portion of packets were correctly received, and, therefore, it can be used for flow control purposes.

Transmission Errors

There are two main types of transmission errors, namely bit errors and packet errors. Bit errors are typically associated with a circuit-switched channel, such as a radio access network connection in mobile communications, and they are caused by imperfections of physical channels, such as radio interference. Such imperfections may result into bit inversions, bit insertions and bit deletions in transmitted data. Packet errors are typically caused by elements in packet-switched networks. For example, a packet router may become congested; i.e. it may get too many packets as input and cannot output them at the same rate. In this situation, its buffers overflow, and some packets get lost. Packet duplication and packet delivery in different order than transmitted are also possible but they are typically considered to be less common than packet losses. Packet errors may also be caused by the implementation of the used transport protocol stack. For example, some protocols use checksums that are calculated in the transmitter and encapsulated with source-coded data. If there is a bit inversion error in the data, the receiver cannot end up into the same checksum, and it may have to discard the received packet.

Second (2G) and third generation (3G) mobile networks, including GPRS, UMTS, and CDMA-2000, provide two basic types of radio link connections, acknowledged and non-acknowledged. An acknowledged connection is such that the integrity of a radio link frame is checked by the recipient (either the Mobile Station, MS, or the Base Station Subsystem, BSS), and, in case of a transmission error, a retransmission request is given to the other end of the radio link. Due to link layer retransmission, the originator has to buffer a radio link frame until a positive acknowledgement for the frame is received. In harsh radio conditions, this buffer may overflow and cause data loss. Nevertheless, it has been shown that it is beneficial to use the acknowledged radio link protocol mode for streaming services. A non-acknowledged connection is such that erroneous radio link frames are typically discarded.

Packet losses can either be corrected or concealed. Loss correction refers to the capability to restore lost data perfectly as if no losses had ever been introduced. Loss concealment refers to the capability to conceal the effects of transmission losses so that they should not be visible in the reconstructed video sequence.

When a player detects a packet loss, it may request for a packet retransmission. Because of the initial buffering, the retransmitted packet may be received before its scheduled playback time. Some commercial Internet streaming systems implement retransmission requests using proprietary protocols. Work is going on in IETF to standardize a selective retransmission request mechanism as a part of RTCP.

A common feature for all of these retransmission request protocols is that they are not suitable for multicasting to a large number of players, as the network traffic may increase drastically. Consequently, multicast streaming applications have to rely on non-interactive packet loss control.

Point-to-point streaming systems may also benefit from non-interactive error control techniques. First, some systems may not contain any interactive error control mechanism or they prefer not to have any feedback from players in order to simplify the system. Second, retransmission of lost packets and other forms of interactive error control typically take a larger portion of the transmitted data rate than non-interactive error control methods. Streaming servers have to ensure that interactive error control methods do not reserve a major portion of the available network throughput. In practice, the servers may have to limit the amount of interactive error control operations. Third, transmission delay may limit the number of interactions between the server and the player, as all interactive error control operations for a specific data sample should preferably be done before the data sample is played back.

Non-interactive packet loss control mechanisms can be categorized to forward error control and loss concealment by post-processing. Forward error control refers to techniques in which a transmitter adds such redundancy to transmitted data that receivers can recover at least part of the transmitted data even if there are transmission losses. Error concealment by post-processing is totally receiver-oriented. These methods try to estimate the correct representation of erroneously received data.

Most video compression algorithms generate temporally predicted INTER or P pictures. As a result, a data loss in one picture causes visible degradation in the consequent pictures that are temporally predicted from the corrupted one. Video communication systems can either conceal the loss in displayed images or freeze the latest correct picture onto the screen until a frame which is independent from the corrupted frame is received.

In conventional video coding standards, the decoding order is coupled with the output order. In other words, the decoding order of I and P pictures is the same as their output order, and the decoding order of a B picture immediately follows the decoding order of the latter reference picture of the B picture in output order. Consequently, it is possible to recover the decoding order based on known output order. The output order is typically conveyed in the elementary video bitstream in the Temporal Reference (TR) field and also in the system multiplex layer, such as in the RTP header. Thus, in conventional video coding standards, the presented problem did not exist.

One solution that is evident for an expert in the field is to use a frame counter-similar to H.263 picture number without a reset to 0 at an IDR picture (as done in the JVT coding standard). However, some problems may occur when that kind of solutions are used. FIG. 5a presents a situation in which continuous numbering scheme is used. If, for example, the IDR picture 137 is lost (can not be received/decoded), the decoder continues to decode the succeeding pictures, but it uses a wrong reference picture. This causes error propagation to succeeding frames until the next frame, which is independent from the corrupted frame, is received and decoded correctly. In the example of FIG. 5b the frame number is reset to 0 at an IDR picture. Now, in a situation in which IDR picture 10 is lost, the decoder notifies that there is a big gap in picture numbering after the latest correctly decoded picture P36. The decoder can then assume that an error has occurred and can freeze the display to the picture P36 until the next frame which is independent from the corrupted frame is received and decoded.

Sub-Sequences

The JVT coding standard also includes a sub-sequence concept, which can enhance temporal scalability compared to the use of non-reference picture so that inter-predicted chains of pictures can be disposed as a whole without affecting the decodability of the rest of the coded stream.

A sub-sequence is a set of coded pictures within a sub-sequence layer. A picture shall reside in one sub-sequence layer and in one sub-sequence only. A sub-sequence shall not depend on any other sub-sequence in the same or in a higher sub-sequence layer. A sub-sequence in layer 0 can be decoded independently of any other sub-sequences and previous long-term reference pictures. FIG. 6a discloses an example of a picture stream containing sub-sequences at layer 1.

A sub-sequence layer contains a subset of the coded pictures in a sequence. Sub-sequence layers are numbered with non-negative integers. A layer having a larger layer number is a higher layer than a layer having a smaller layer number. The layers are ordered hierarchically based on their dependency on each other so that a layer does not depend on any higher layer and may depend on lower layers. In other words, layer 0 is independently decodable, pictures in layer 1 may be predicted from layer 0, pictures in layer 2 may be predicted from layers 0 and 1, etc. The subjective quality is expected to increase along with the number of decoded layers.

The sub-sequence concept is included in the JVT coding standard as follows: The required_frame_num_update_behaviour_flag equal to 1 in the sequence parameter set signals that the coded sequence may not contain all sub-sequences. The usage of the required_frame_num_update_behaviour_flag releases the requirement for the frame number increment of 1 for each reference frame. Instead, gaps in frame numbers are marked specifically in the decoded picture buffer. If a "missing" frame number is referred to in inter prediction, a loss of a picture is inferred. Otherwise, frames corresponding to "missing" frame numbers are handled as if they were normal frames inserted to the decoded picture buffer with the sliding window buffering mode. All the pictures in a disposed sub-sequence are consequently assigned a "missing" frame number in the decoded picture buffer, but they are never used in inter prediction for other sub-sequences.

The JVT coding standard also includes optional sub-sequence related SEI messages. The sub-sequence information SEI message is associated with the next slice in decoding order. It signals the sub-sequence layer and sub-sequence identifier (sub_seq_id) of the sub-sequence to which the slice belongs.

Each IDR picture contains an identifier (idr_pic_id). If two IDR pictures are consecutive in decoding order, without any intervening picture, the value of idr_pic_id shall change from the first IDR picture to the other one. If the current picture resides in a sub-sequence whose first picture in decoding order is an IDR picture, the value of sub_seq_id shall be the same as the value of idr_pic_id of the IDR picture.

The solution in JVT-D093 works correctly only if no data resides in sub-sequence layers 1 or above. If transmission order differs from decoding order and coded pictures resided in sub-sequence layer 1, their decoding order relative to pictures in sub-sequence layer 0 could not be concluded based on sub-sequence identifiers and frame numbers. For example, consider the following coding scheme presented on FIG. 6b where output order runs from left to right, boxes indicate pictures, capital letters within boxes indicate coding types, numbers within boxes are frame numbers according to the JVT coding standard, underlined characters indicate non-reference pictures, and arrows indicate prediction dependencies. If pictures are transmitted in order I0, P1, P3, I0, P1, B2, B4, P5, it cannot be concluded to which independent GOP picture B2 belongs.

It could be argued that in the previous example the correct independent GOP for picture B2 could be concluded based on its output timestamp. However, the decoding order of pictures cannot be recovered based on output timestamps and picture numbers, because decoding order and output order are decoupled. Consider the following example (FIG. 6c) where output order runs from left to right, boxes indicate pictures, capital letters within boxes indicate coding types, numbers within boxes are frame numbers according to the JVT coding standard, and arrows indicate prediction dependencies. If pictures are transmitted out of decoding order, it cannot be reliably detected whether picture P4 should be decoded after P3 of the first or second independent GOP in output order.

Buffering

Streaming clients typically have a receiver buffer that is capable of storing a relatively large amount of data. Initially, when a streaming session is established, a client does not start playing the stream back immediately, but rather it typically buffers the incoming data for a few seconds. This buffering helps to maintain continuous playback, because, in case of occasional increased transmission delays or network throughput drops, the client can decode and play buffered data. Otherwise, without initial buffering, the client has to freeze the display, stop decoding, and wait for incoming data. The buffering is also necessary for either automatic or selective retransmission in any protocol level. If any part of a picture is lost, a retransmission mechanism may be used to resend the lost data. If the retransmitted data is received before its scheduled decoding or playback time, the loss is perfectly recovered.

Coded pictures can be ranked according to their importance in the subjective quality of the decoded sequence. For example, non-reference pictures, such as conventional B pictures, are subjectively least important, because their absence does not affect decoding of any other pictures. Subjective ranking can also be made on data partition or slice group basis. Coded slices and data partitions that are subjectively the most important can be sent earlier than their decoding order indicates, whereas coded slices and data partitions that are subjectively the least important can be sent later than their natural coding order indicates. Consequently, any retransmitted parts of the most important slice and data partitions are more likely to be received before their scheduled decoding or playback time compared to the least important slices and data partitions.

Pre-Decoder Buffering

Pre-decoder buffering refers to buffering of coded data before it is decoded. Initial buffering refers to pre-decoder buffering at the beginning of a streaming session. Initial buffering is conventionally done for two reasons explained below.

In conversational packet-switched multimedia systems, e.g., in IP-based video conferencing systems, different types of media are normally carried in separate packets. Moreover, packets are typically carried on top of a best-effort network that cannot guarantee a constant transmission delay, but rather the delay may vary from packet to packet. Consequently, packets having the same presentation (playback) time-stamp may not be received at the same time, and the reception interval of two packets may not be the same as their presentation interval (in terms of time). Thus, in order to maintain playback synchronization between different media types and to maintain the correct playback rate, a multimedia terminal typically buffers received data for a short period (e.g. less than half a second) in order to smooth out delay variation. Herein, this type of a buffer component is referred as a delay jitter buffer. Buffering can take place before and/or after media data decoding.

Delay jitter buffering is also applied in streaming systems. Due to the fact that streaming is a non-conversational application, the delay jitter buffer required may be considerably larger than in conversational applications. When a streaming player has established a connection to a server and requested a multimedia stream to be downloaded, the server begins to transmit the desired stream. The player does not start playing the stream back immediately, but rather it typically buffers the incoming data for a certain period, typically a few seconds. Herein, this buffering is referred to as initial buffering. Initial buffering provides the ability to smooth out transmission delay variations in a manner similar to that provided by delay jitter buffering in conversational applications. In addition, it may enable the use of link, transport, and/or application layer retransmissions of lost protocol data units (PDUs). The player can decode and play buffered data while retransmitted PDUs may be received in time to be decoded and played back at the scheduled moment.

Initial buffering in streaming clients provides yet another advantage that cannot be achieved in conversational systems: it allows the data rate of the media transmitted from the server to vary. In other words, media packets can be temporarily transmitted faster or slower than their playback rate as long as the receiver buffer does not overflow or underflow. The fluctuation in the data rate may originate from two sources.

First, the compression efficiency achievable in some media types, such as video, depends on the contents of the source data. Consequently, if a stable quality is desired, the bit-rate of the resulting compressed bit-stream varies. Typically, a stable audio-visual quality is subjectively more pleasing than a varying quality. Thus, initial buffering enables a more pleasing audio-visual quality to be achieved compared with a system without initial buffering, such as a video conferencing system.

Second, it is commonly known that packet losses in fixed IP networks occur in bursts. In order to avoid bursty errors and high peak bit- and packet-rates, well-designed streaming servers schedule the transmission of packets carefully. Packets may not be sent precisely at the rate they are played back at the receiving end, but rather the servers may try to achieve a steady interval between transmitted packets. A server may also adjust the rate of packet transmission in accordance with prevailing network conditions, reducing the packet transmission rate when the network becomes congested and increasing it if network conditions allow, for example.

Hypothetical Reference Decoder (HRD)/Video Buffering Verifier (VBV)

Many video coding standards include a HRD/VBV specification as an integral part of the standard. The HRD/VBV specification is a hypothetical decoder model that contains an input (pre-decoder) buffer. The coded data flows in to the input buffer typically at a constant bit rate. Coded pictures are removed from the input buffer at their decoding timestamps, which may be the same as their output timestamps. The input buffer is of certain size depending on the profile and level in use. The HRD/VBV model is used to specify interoperability points from processing and memory requirements point of view. Encoders shall guarantee that a generated bitstream conforms to the HRD/VBV specification according to HRD/VBV parameter values of certain profile and level. Decoders claiming the support for a certain profile and level shall be able to decode the bitstream that conforms to the HRD/VBV model.

The HRD comprises a coded picture buffer for storing coded data stream and a decoded picture buffer for storing decoded reference pictures and for reordering decoded pictures in display order. The HRD moves data between the buffers similarly to the decoder of an decoding device does. However, the HRD need not decode the coded pictures entirely nor output the decoded pictures, but the HRD only checks that the decoding of the picture stream can be performed under the constraints given in the coding standard. When the HRD is operating, it receives a coded data stream and stores it to the coded picture buffer. In addition, the HRD removes coded pictures from the coded picture buffer and stores at least some of the corresponding hypothetically decoded pictures into the decoded picture buffer. The HRD is aware of the input rate according to which the coded data flows into the coded picture buffer, the removal rate of the pictures from the coded picture buffer, and the output rate of the pictures from the decoded picture buffer. The HRD checks for coded or decoded picture buffer overflows, and it indicates if the decoding is not possible with the current settings. Then the HRD informs the encoder about the buffering violation wherein the encoder can change the encoding parameters by, for example, reducing the number of reference frames, to avoid buffering violation. Alternatively or additionally, the encoder starts to encode the pictures with the new parameters and sends the encoded pictures to the HRD which again performs the decoding of the pictures and the necessary checks. As a yet another alternative, the encoder may discard the latest encoded frame and encode later frames so that no buffering violation happens.

Two types of decoder conformance have been specified in the JVT coding standard: output order conformance (VCL conformance) and output time conformance (VCL-NAL conformance). These types of conformance have been specified using the HRD specification. The output order conformance refers to the ability of the decoder to recover the output order of pictures correctly. The HRD specification includes a "bumping decoder" model that outputs the earliest uncompressed picture in output order when a new storage space for a picture is needed. The output time conformance refers to the ability of the decoder to output pictures at the same pace as the HRD model does. The output timestamp of a picture must always be equal to or smaller than the time when it would be removed from the "bumping decoder".

Interleaving

Frame interleaving is a commonly used technique in audio streaming. In the frame interleaving technique, one RTP packet contains audio frames that are not consecutive in decoding or output order. If one packet in the audio packet stream is lost, the correctly received packets contain neighbouring audio frames which can be used for concealing the lost audio packet (by some sort of interpolating). Many audio coding RTP payload and MIME type specifications contain the possibility to signal the maximum amount of interleaving in one packet in terms of audio frames.

In some prior art encoding/decoding methods the size of the needed buffer is informed as a count of transmission units.

SUMMARY OF THE INVENTION

The maximum size of the predecoding buffer of a decoder can be informed as bytes to the decoder. If the byte based scheme is used and the reordering process is not defined for the decoder, the buffering model has to be explicitly defined, because the encoder and decoder may use different buffering schemes. If a certain size in bytes is defined for the buffer and the decoder uses a buffering scheme in which transmission units are stored to the buffer until the buffer is full and only after that the oldest data is removed from the buffer and decoded. That kind of buffering may last longer than necessary before the decoding is started.

Another possibility to inform the maximum size of the predecoding buffer is to use transmission units, therein the size of the buffer is informed as maximum amount of transmission units to be buffered. However, the maximum size of the transmission unit is not defined and the size of the transmission unit may vary. If the maximum size were defined and if the size is too small for a certain data unit, the data unit has to be divided into more than one transmission unit, which increases encoding and transmission overhead i.e. decreases the compression efficiency and/or increases system complexity. The maximum size of the transmission unit should be large enough wherein the total size of the buffer may be unnecessarily large.

In the present invention the buffer size is defined so that the total size of at least two transmission units is defined and the maximum buffer size is defined on the basis of the total size. In addition to the total size it may be necessary to take into account a network transmission jitter.

According to another aspect of the present invention the number of transmission units used in the calculation of the total size is a fractional number of the necessary buffer size in terms of the number of transmission units.

According to still another aspect of the present invention the number of transmission units used in the calculation of the total size is a fractional number of the necessary buffer size in terms of the number of transmission units, wherein the fractional number is of the form $1/N$ N being an integer number.

According to yet another aspect of the present invention the number of transmission units used in the calculation of the total size is the same as the necessary buffer size in terms of the number of transmission units.

In an embodiment of the present invention the number of transmission units used in the calculation of the total size is expressed as in buffering order of the transmission units. The buffering order relates to the order the transmission units are buffered in the decoder for decoding i.e. the buffering order in the predecoder buffer.

The invention enables defining the size of the receiving buffer to the decoder.

In the following, an independent GOP consists of pictures from an IDR picture (inclusive) to the next IDR picture (exclusive) in decoding order.

In the present invention a parameter signalling the maximum amount of required buffering, is proposed. Several units for such parameter were considered: duration, bytes, coded pictures, frames, VCL NAL units, all types of NAL units, and RTP packets or payloads. Specifying the amount of disorder in duration causes a dependency between the transmission bit rate and the specified duration to conclude the required amount of buffering in bytes. As the transmission bit rate is not generally known, the duration-based approach is not used. Specifying the amount of disorder in number of bytes would require the transmitter to check the transmitted stream carefully so that the signalled limit would not be exceeded. This approach requires a lot of processing power from all servers. It would also require specifying a buffering verifier for servers. Specifying the amount of disorder in coded pictures or frames is too coarse a unit, since a simple slice interleaving method for decoders that do not support arbitrary slice ordering would require a sub-picture resolution to achieve minimal latency of buffering for recovery of the decoding order. Specifying the amount of disorder in number of RTP packets was not considered as appropriate, because different types of aggregate packets may exist depending on the prevailing network conditions. Thus, one RTP packet may contain a varying amount of data. Different SEI messages may be transmitted depending on the prevailing network conditions. For example, in relatively bad conditions, it is beneficial to transmit SEI messages that are targeted for error resilience, such as the scene information SEI message. Thus, the amount of disorder in number of all types of NAL units depends on prevailing network conditions, i.e., the amount of SEI and parameter set NAL units being transmitted out of order. Therefore, "all types of NAL units" was not seen as a good unit either. Consequently, specifying the amount of disorder in number VCL NAL units was considered as the best alternative. VCL NAL units are defined in the JVT coding standard to be coded slices, coded data partitions, or end-of-sequence markers.

The proposed parameter is the following: num-reorder-VCL-NAL-units. It specifies the maximum amount of VCL NAL units that precede any VCL NAL unit in the packet stream in NAL unit delivery order and follow the VCL NAL unit in RTP sequence number order or in the composition order of the aggregation packet containing the VCL NAL unit.

The proposed parameter can be conveyed as an optional parameter in the MIME type announcement or as optional SDP fields. The proposed parameter can indicate decoder capability or stream characteristics or both, depending on the protocol and the phase of the session setup procedure.

The buffer size of a buffer built according to the num-reorder-VCL-NAL-units parameter cannot be specified accurately in bytes. In order to allow designing of receivers where the buffering memory requirements are known accurately, specification of decoding time conformance is proposed. Decoding time conformance is specified using a hypothetical buffering model that does not assume a constant input bit rate, but rather requires that streaming servers shall include the model to guarantee that the transmitted packet stream conforms to the model. The specified hypothetical buffer model smooths out possibly bursty packet rate and reorders NAL units from transmission order to the decoding order so that the resulting bitstream can be input to the hypothetical decoder at a constant bit rate.

In the following description the invention is described by using encoder-decoder based system, but it is obvious that the invention can also be implemented in systems in which the video signals are stored. The stored video signals can be either uncoded signals stored before encoding, as encoded signals stored after encoding, or as decoded signals stored after encoding and decoding process. For example, an encoder produces bitstreams in decoding order. A file system receives audio and/or video bitstreams which are encapsulated e.g. in decoding order and stored as a file. In addition, the encoder and the file system can produce metadata which informs subjective importance of the pictures and NAL units, contains information on sub-sequences, inter alia. The file can be stored into a database from which a streaming server can read the NAL units and encapsulate them into RTP packets. According to the optional metadata and the data connection in use, the streaming server can modify the transmission order of the packets different from the decoding order, remove sub-sequences, decide what SEI-messages will be transmitted, if any, etc. In the receiving end the RTP packets are received and buffered. Typically, the NAL units are first reordered into correct order and after that the NAL units are delivered to the decoder.

Furthermore, in the following description the invention is described by using encoder-decoder based system, but it is obvious that the invention can also be implemented in systems where the encoder outputs and transmits coded data to another component, such as a streaming server, in decoding order, where the other component reorders the coded data from the decoding order to another order and forwards the coded data in its reordered form to the decoder.

The method according to the present invention is primarily characterized in that the buffer size is defined so that the total size of at least two transmission units is defined and the maximum buffer size is defined on the basis of the total size. The system according to the present invention is primarily characterized in that the system further comprises a definer for defining the buffer size so that the total size of at least two transmission units is defined and the maximum buffer size is defined on the basis of the total size. The encoder according to the present invention is primarily characterized in that the encoder further comprises a definer for defining the buffer size so that the total size of at least two transmission units is defined and the maximum buffer size is defined on the basis of the total size. The decoder according to the present invention is primarily characterized in that the decoder further comprises a processor for allocating memory for the pre-decoding buffer according to a received parameter indicative of the buffer size, and the buffer size is defined so that the total size of at least two transmission units is defined and the maximum buffer size is defined on the basis of the total size. The transmitting device according to the present invention is primarily characterized in that the transmitting device further comprising a definer for defining the buffer size so that the total size of at least two transmission units is defined and the maximum buffer size is defined on the basis of the total size. The receiving device according to the present invention is primarily characterized in that the decoder further comprising a processor for allocating memory for the pre-decoding buffer according to a received parameter indicative of the buffer size, and the buffer size is defined so that the total size of at least two transmission units is defined and the maximum buffer size is defined on the basis of the total size. The software program according to the present invention is primarily characterized in that the buffer size is defined so that the total size of at least two transmission units is defined and the maximum buffer size is defined on the basis of the total size. The storage medium according to the present invention is primarily characterized in that the buffer size is defined so that the total size of at least two transmission units is defined and the maximum buffer size is defined on the basis of the total size. The electronic device according to the present invention is primarily characterized in that the electronic device further comprises a definer for defining the buffer size so that the total size of at least two transmission units is defined and the maximum buffer size is defined on the basis of the total size.

Substitutive signalling to any decoding order information in the video bitstream is presented in the following according to an advantageous embodiment of the present invention. A Decoding Order Number (DON) indicates the decoding order of NAL units, in other the delivery order of the NAL units to the decoder. Hereinafter, DON is assumed to be a 16-bit unsigned integer without the loss of generality. Let DON of one NAL unit be D1 and DON of another NAL unit be D2. If D1<D2 and D2−D1<32768, or if D1>D2 and D1−D2>=32768, then the NAL unit having DON equal to D1 precedes the NAL unit having DON equal to D2 in NAL unit delivery order. If D1<D2 and D2−D1>=32768, or if D1>D2 and D1−D2<32768, then the NAL unit having DON equal to D2 precedes the NAL unit having DON equal to D1 in NAL unit delivery order. NAL units associated with different primary coded pictures do not have the same value of DON. NAL units associated with the same primary coded picture may have the same value of DON. If all NAL units of a primary coded picture have the same value of DON, NAL units of a redundant coded picture associated with the primary coded picture should have the same value of DON as the NAL units of the primary coded picture. The NAL unit delivery order of NAL units having the same value of DON is preferably the following:
1. Picture delimiter NAL unit, if any
2. Sequence parameter set NAL units, if any
3. Picture parameter set NAL units, if any
4. SEI NAL units, if any 5. Coded slice and slice data partition NAL units of the primary coded picture, if any
6. Coded slice and slice data partition NAL units of the redundant coded pictures, if any
7. Filler data NAL units, if any
8. End of sequence NAL unit, if any
9. End of stream NAL unit, if any.

The present invention improves the buffering efficiency of the coding systems. By using the present invention it is possible to inform the decoding device how much pre-decoding buffering is required. Therefore, there is no need to allocate more memory for the pre-decoding buffer than necessary in the decoding device. Also, pre-decoding buffer overflow can be avoided.

DETAILED DESCRIPTION OF THE INVENTION

Figure 1:
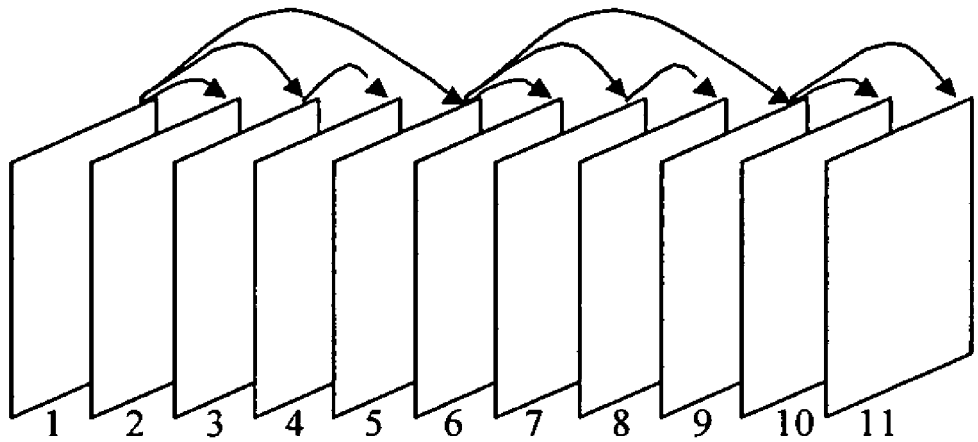
FIG. 1 shows an example of a recursive temporal scalability scheme.
Figure 1:
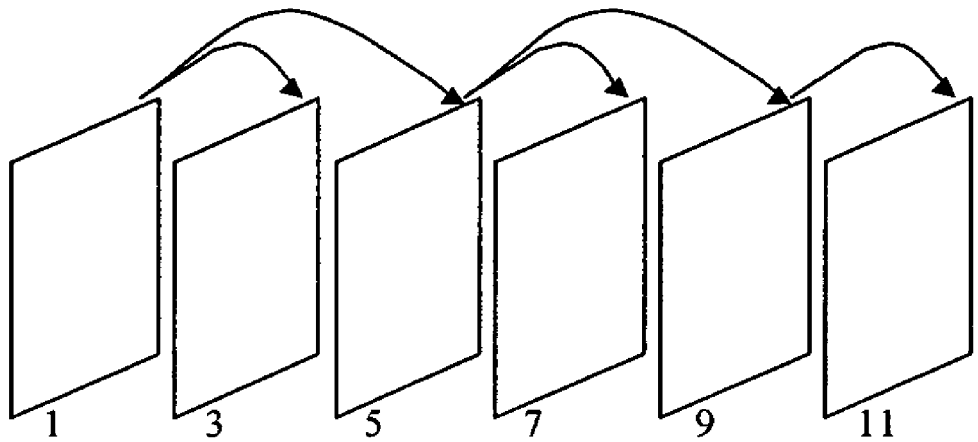
Figure 2:
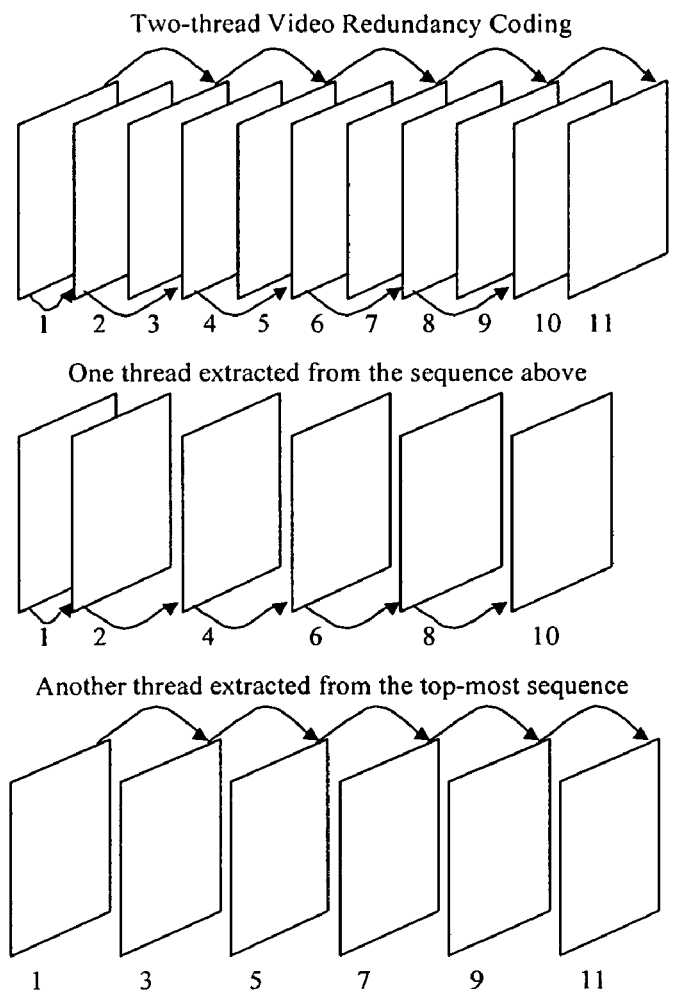
FIG. 2 depicts a scheme referred to as Video Redundancy Coding, where a sequence of pictures is divided into two or more independently coded threads in an interleaved manner.
Figure 3:
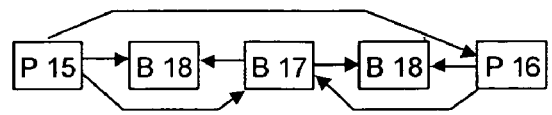
FIG. 3 presents an example of a prediction structure potentially improving compression efficiency.
Figure 4:
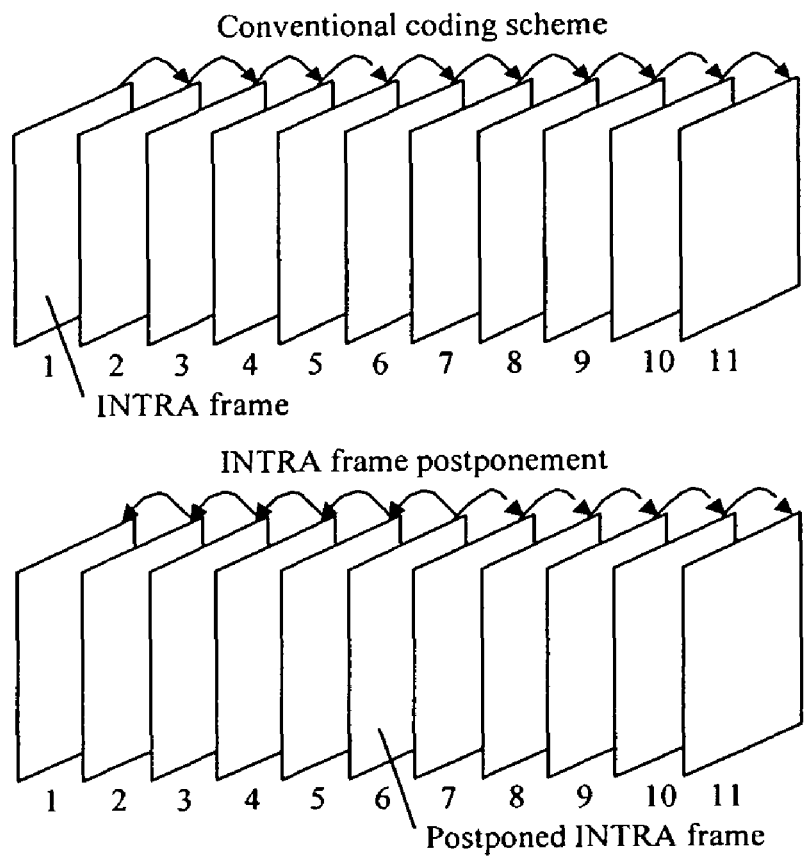
FIG. 4 presents an example of the intra picture postponement method that can be used to improve error resiliency, FIGS. 5a and 5b disclose different prior art numbering schemes for pictures of encoded video stream, FIG. 6a discloses an example of a picture stream containing sub-sequences at layer 1, FIG. 6b discloses an example of a picture stream containing two group of pictures having sub-sequences at layer 1, FIG. 6c discloses an example of a picture stream of different group of pictures, FIG. 7 discloses another example of a picture stream containing sub-sequences at layer 1.
Figure 5A:
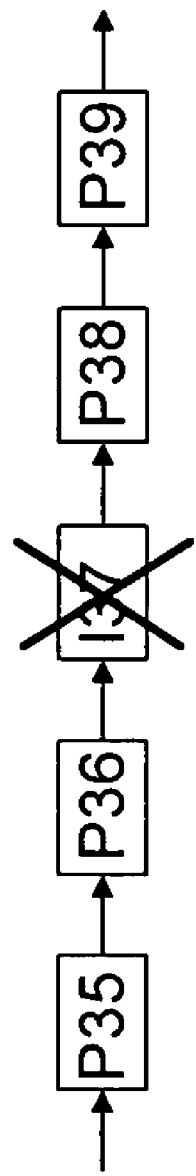
Figure 5B:
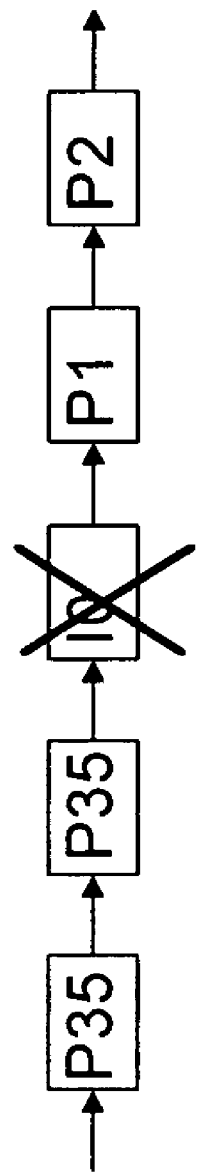

The general concept behind de-packetization rules is to reorder transmission units such as NAL units from transmission order to the NAL unit decoding order.

The receiver includes a receiver buffer (or a predecoder buffer), which is used to reorder packets from transmission order to the NAL unit decoding order. In an example embodiment of the present invention the receiver buffer size is set, in terms of number of bytes, equal to or greater than the value of a deint-buf-size parameter, for example to a value 1.2*the value of deint-buf-size MIME parameter. The receiver may also take buffering for transmission delay jitter into account and either reserve a separate buffer for transmission delay jitter buffering or combine the buffer for transmission delay jitter with the receiver buffer (and hence reserve some additional space for delay jitter buffering in the receiver buffer).

The receiver stores incoming NAL units in reception order into the receiver buffer as follows. NAL units of aggregation packets are stored into the receiver buffer individually. The value of DON is calculated and stored for all NAL units.

Hereinafter, let N be the value of the optional num-reorder-VCL-NAL-units parameter (interleaving-depth parameter) which specifies the maximum amount of VCL NAL units that precede any VCL NAL unit in the packet stream in NAL unit transmission order and follow the VCL NAL unit in decoding order. If the parameter is not present, a 0 value number could be implied.

When the video stream transfer session is initialized, the receiver 8 allocates memory for the receiving buffer 9.1 for storing at least N pieces of VCL NAL units. The receiver then starts to receive the video stream and stores the received VCL NAL units into the receiving buffer. The initial buffering lasts
  until at least N pieces of VCL NAL units are stored into the receiving buffer 9.1, or
  if max-don-diff MIME parameter is present, until the value of a function don_diff(m,n) is greater than the value of max-don-diff, in which n corresponds to the NAL unit having the greatest value of AbsDON among the received NAL units and m corresponds to the NAL unit having the smallest value of AbsDON among the received NAL units, or
  until initial buffering has lasted for the duration equal to or greater than the value of the optional init-buf-time MIME parameter.

The function don_diff(m,n) is specified as follows:

If $DON(m) == DON(n)$, $don\_diff(m,n) = 0$

If $(DON(m) < DON(n)$ and $DON(n) - DON(m) < 32768)$,
  $don\_diff(m,n) = DON(n) - DON(m)$ If $(DON(m) > DON(n)$ and $DON(m) - DON(n) >= 32768)$, $don\_diff(m,n) = 65536 - DON(m) + DON(n)$ If $(DON(m) < DON(n)$ and $DON(n) - DON(m) >= 32768)$, $don\_diff(m,n) = -(DON(m) + 65536 - DON(n))$ If $(DON(m) > DON(n)$ and $DON(m) - DON(n) < 32768)$,
  $don\_diff(m,n) = -(DON(m) - DON(n))$ where DON(i) is the decoding order number of the NAL unit having index i in the transmission order.

A positive value of don_diff(m,n) indicates that the NAL unit having transmission order index n follows, in decoding order, the NAL unit having transmission order index m.

AbsDON denotes such decoding order number of the NAL unit that does not wrap around to 0 after 65535. In other words, AbsDON is calculated as follows:

Let m and n are consecutive NAL units in transmission order. For the very first NAL unit in transmission order (whose index is 0), AbsDON(0)=DON(0) For other NAL units, AbsDON is calculated as follows:

If $DON(m) == DON(n)$, $AbsDON(n) = AbsDON(m)$

If $(DON(m) < DON(n)$ and $DON(n) - DON(m) < 32768)$,
  $AbsDON(n) = AbsDON(m) + DON(n) - DON(m)$ If $(DON(m) > DON(n)$ and $DON(m) - DON(n) >= 32768)$, $AbsDON(n) = AbsDON(m) + 65536 - DON(m) + DON(n))$ If (DON($m$)<DON($n$) and DON($n$)−
DON($m$)>=32768), AbsDON($n$)=AbsDON($m$)−
(DON($m$)+65536−DON($n$))

If (DON($m$)>DON($n$) and DON($m$)−DON($n$)<32768),
AbsDON($n$)=AbsDON($m$)−(DON($m$)−DON($n$))

where DON(i) is the decoding order number of the NAL unit having index i in the transmission order.

There are usually two buffering states in the receiver: initial buffering and buffering while playing. Initial buffering occurs when the RTP session is initialized. After initial buffering, decoding and playback is started and the buffering-while-playing mode is used.

When the receiver buffer 9.1 contains at least N VCL NAL units, NAL units are removed from the receiver buffer 9.1 one by one and passed to the decoder 2. The NAL units are not necessarily removed from the receiver buffer 9.1 in the same order in which they were stored, but according to the DON of the NAL units, as described below. The delivery of the packets to the decoder 2 is continued until the buffer contains less than N VCL NAL units, i.e. N−1 VCL NAL units.

The NAL units to be removed from the receiver buffer are determined as follows:

If the receiver buffer contains at least N VCL NAL units, NAL units are removed from the receiver buffer and passed to the decoder in the order specified below until the buffer contains N−1 VCL NAL units.

If max-don-diff is present, all NAL units m for which don_diff(m,n) is greater than max-don-diff are removed from the receiver buffer and passed to the decoder in the order specified below. Herein, n corresponds to the NAL unit having the greatest value of AbsDON among the received NAL units.

A variable ts is set to the value of a system timer that was initialized to 0 when the first packet of the NAL unit stream was received. If the receiver buffer contains a NAL unit whose reception time tr fulfills the condition that ts−tr>init-buf-time, NAL units are passed to the decoder (and removed from the receiver buffer) in the order specified below until the receiver buffer contains no NAL unit whose reception time tr fulfills the specified condition.

The order that NAL units are passed to the decoder is specified as follows.

Let PDON be a variable that is initialized to 0 at the beginning of the an RTP session. For each NAL unit associated with a value of DON, a DON distance is calculated as follows. If the value of DON of the NAL unit is larger than the value of PDON, the DON distance is equal to DON−PDON. Otherwise, the DON distance is equal to 65535−PDON+DON+1.

NAL units are delivered to the decoder in ascending order of DON distance. If several NAL units share the same value of DON distance, they can be passed to the decoder in any order. When a desired number of NAL units have been passed to the decoder, the value of PDON is set to the value of DON for the last NAL unit passed to the decoder.

Additional De-Packetization Guidelines

The following additional de-packetization rules may be used to implement an operational H.264 de-packetizer:

Intelligent RTP receivers (e.g. in gateways) may identify lost coded slice data partitions A (DPAs). If a lost DPA is found, a gateway may decide not to send the corresponding coded slice data partitions B and C, as their information is meaningless for H.264 decoders. In this way a network element can reduce network load by discarding useless packets, without parsing a complex bitstream.

Intelligent RTP receivers (e.g. in gateways) may identify lost Fractiona Units (FU). If a lost FU is found, a gateway may decide not to send the following FUs of the same NAL unit, as their information is meaningless for H.264 decoders. In this way a network element can reduce network load by discarding useless packets, without parsing a complex bitstream.

Intelligent receivers having to discard packets or NALUs could first discard all packets/NALUs in which the value of the NRI field of the NAL unit type octet is equal to 0. This may minimize the impact on user experience.

In the following a parameter to be used for indicating the maximum buffer size in the decoder will be described. The parameter deint-buf-size is normally not present when a packetization-mode parameter indicative of the packetization mode is not present or the value of the packetization-mode parameter is equal to 0 or 1. This parameter should be present when the value of the packetization-mode parameter is equal to 2.

The value of the deint-buf-size parameter is specified in association with the following hypothetical deinterleaving buffer model. At the beginning, the hypothetical deinterleaving buffer is empty and the maximum buffer occupancy m is set to 0. The following process is used in the model:

i) The next VCL NAL unit in transmission order is inserted to the hypothetical deinterleaving buffer.
ii) Let s be the total size of VCL NAL units in the buffer in terms of bytes.
iii) If s is greater than m, m is set equal to s.
iv) If the number of VCL NAL units in the hypothetical deinterleaving buffer is less than or equal to the value of interleaving-depth, the process is continued from stage vii.
v) The VCL NAL unit earliest in decoding order among the VCL NAL units in the hypothetical deinterleaving buffer is determined from the values of DON for the VCL NAL units according to section 5.5 of RFC XXXX.
vi) The earliest VCL NAL unit is removed from the hypothetical deinterleaving buffer.
vii) If there are no more VCL NAL units in transmission order, the process is terminated.
viii) The process is continued from stage i.

This parameter signals the properties of a NAL unit stream or the capabilities of a receiver implementation. When the parameter is used to signal the properties of a NAL unit stream, the value of the parameter, referred to as v, is such that:

a) the value of m resulting when the NAL unit stream is entirely processed by the hypothetical deinterleaving buffer model is less than or equal to v, or
b) the order of VCL NAL units determined by removing the earliest VCL NAL unit from a deinterleaving buffer as long as there is a buffer overflow is the same as the removal order of VCL NAL units from the hypothetical deinterleaving buffer.

Consequently, it is guaranteed that receivers can reconstruct VCL NAL unit decoding order, when the buffer size for VCL NAL unit decoding order recovery is at least the value of deint-buf-size in terms of bytes.

When the parameter is used to signal the capabilities of a receiver implementation, the receiver is able to correctly reconstruct the VCL NAL unit decoding order of any NAL unit stream that are characterized by the same value of deint-buf-size. When the receiver buffers such number of bytes that equals to or is greater than the value of deint-buf-size, it is able to reconstruct VCL NAL unit decoding order from the transmission order.

The non-VCL NAL units should also be taken into account when determining the size of the deinterleaving buffer. When this parameter is present, a sufficient size of the deinterleaving buffer for all NAL units is less than or equal to 20% larger than the value of the parameter.

If the parameter is not present, then a value of 0 is used for deint-buf-size. The value of deint-buf-size is an integer in the range of, for example, 0 to 4 294 967 295, inclusive.

Figure 8:
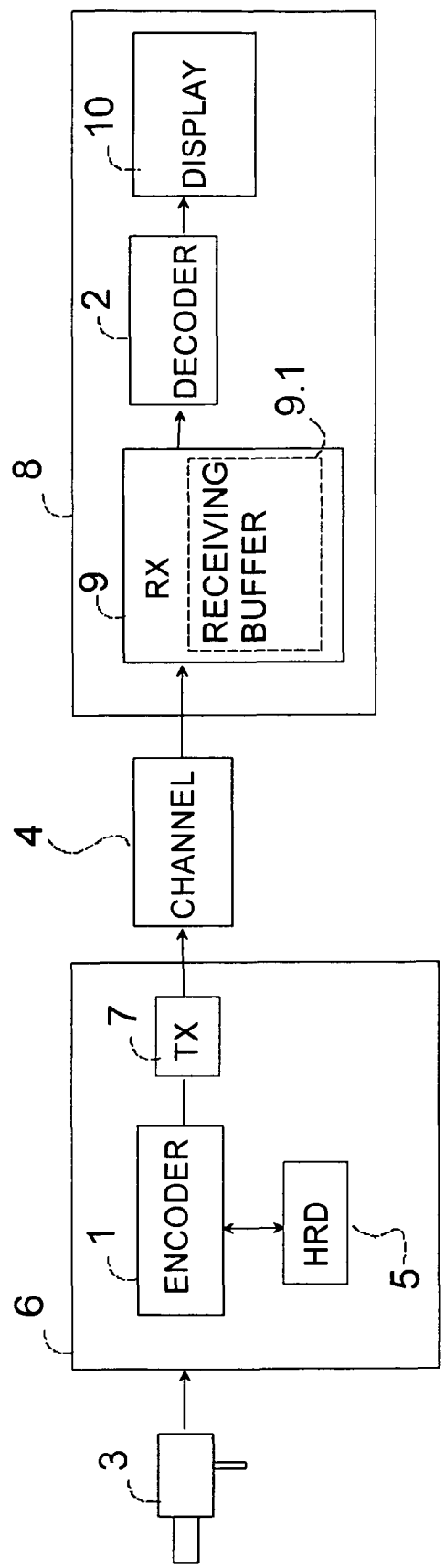
FIG. 8 depicts an advantageous embodiment of the system according to the present invention.
Figure 9:
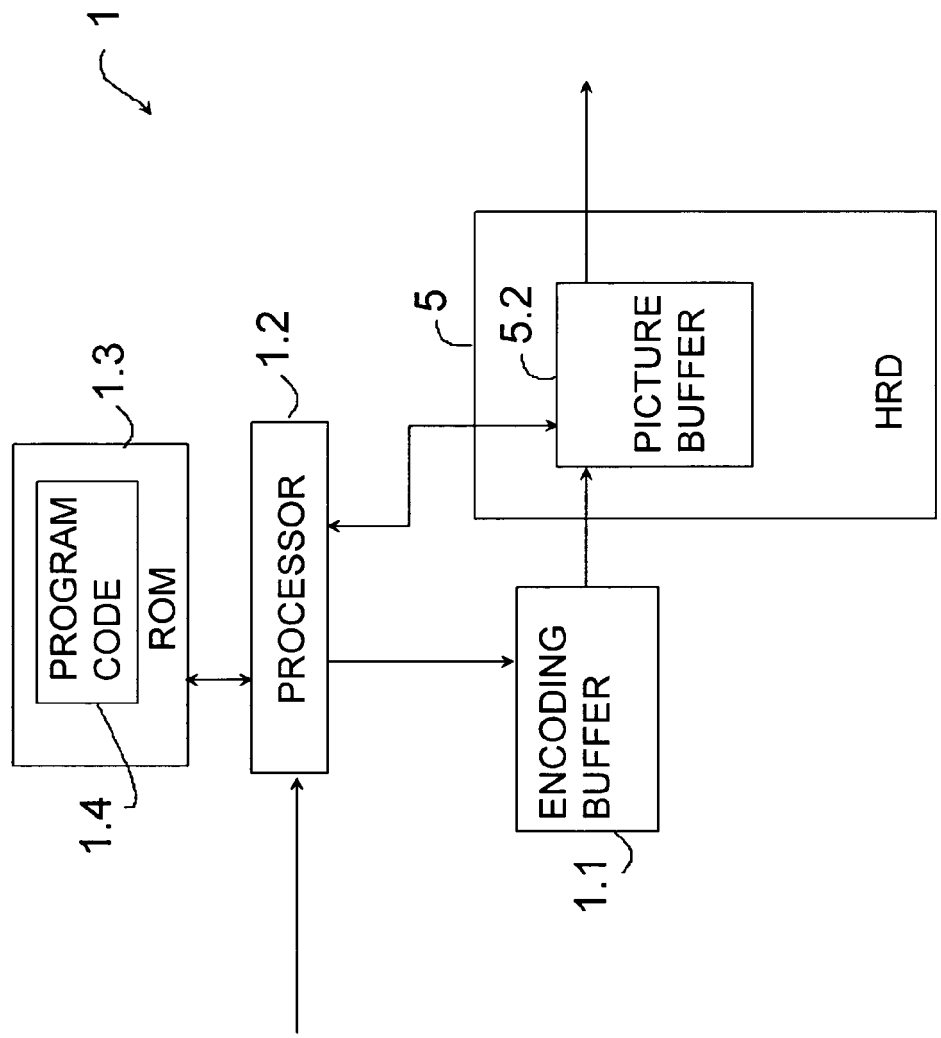
FIG. 9 depicts an advantageous embodiment of the encoder according to the present invention.
Figure 10:
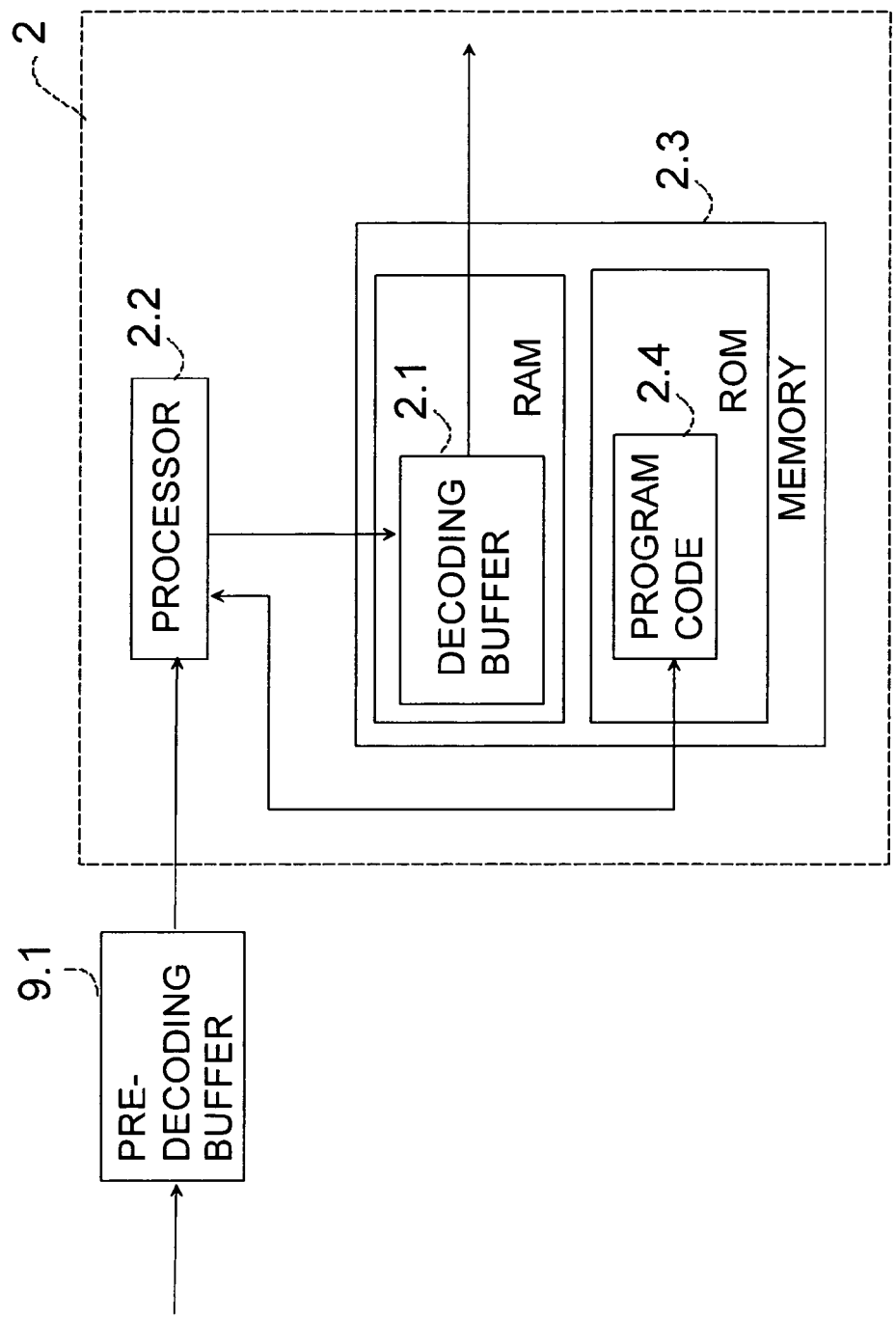
FIG. 10 depicts an advantageous embodiment of the decoder according to the present invention, FIG. 11a discloses an example of the NAL packet format which can be used with the present invention, FIG. 11b discloses another example of the NAL packet format which can be used with the present invention.

In the following the invention will be described in more detail with reference to the system of FIG. 8, the encoder 1 and the hypothetical reference decoder (HRD) 5 of FIG. 9 and decoder 2 of FIG. 10. The pictures to be encoded can be, for example, pictures of a video stream from a video source 3, e.g. a camera, a video recorder, etc. The pictures (frames) of the video stream can be divided into smaller portions such as slices. The slices can further be divided into blocks. In the encoder 1 the video stream is encoded to reduce the information to be transmitted via a transmission channel 4, or to a storage media (not shown). Pictures of the video stream are input to the encoder 1. The encoder has an encoding buffer 1.1 (FIG. 9) for temporarily storing some of the pictures to be encoded. The encoder 1 also includes a memory 1.3 and a processor 1.2 in which the encoding tasks according to the invention can be applied. The memory 1.3 and the processor 1.2 can be common with the transmitting device 6 or the transmitting device 6 can have another processor and/or memory (not shown) for other functions of the transmitting device 6.

The encoder 1 performs motion estimation and/or some other tasks to compress the video stream. In motion estimation similarities between the picture to be encoded (the current picture) and a previous and/or latter picture are searched. If similarities are found the compared picture or part of it can be used as a reference picture for the picture to be encoded. In JVT the display order and the decoding order of the pictures are not necessarily the same, wherein the reference picture has to be stored in a buffer (e.g. in the encoding buffer 1.1) as long as it is used as a reference picture. The encoder 1 also inserts information on display order of the pictures into the transmission stream.

From the encoding process the encoded pictures are moved to an encoded picture buffer 5.2, if necessary. The encoded pictures are transmitted from the encoder 1 to the decoder 2 via the transmission channel 4. In the decoder 2 the encoded pictures are decoded to form uncompressed pictures corresponding as much as possible to the encoded pictures. Each decoded picture is buffered in the DPB 2.1 of the decoder 2 unless it is displayed substantially immediately after the decoding and is not used as a reference picture. In the system according to the present invention both the reference picture buffering and the display picture buffering are combined and they use the same decoded picture buffer 2.1. This eliminates the need for storing the same pictures in two different places thus reducing the memory requirements of the decoder 2.

The decoder 1 also includes a memory 2.3 and a processor 2.2 in which the decoding tasks according to the invention can be applied. The memory 2.3 and the processor 2.2 can be common with the receiving device 8 or the receiving device 8 can have another processor and/or memory (not shown) for other functions of the receiving device 8.

Encoding

Let us now consider the encoding-decoding process in more detail. Pictures from the video source 3 are entered to the encoder 1 and advantageously stored in the encoding buffer 1.1. The encoding process is not necessarily started immediately after the first picture is entered to the encoder, but after a certain amount of pictures are available in the encoding buffer 1.1. Then the encoder 1 tries to find suitable candidates from the pictures to be used as the reference frames. The encoder 1 then performs the encoding to form encoded pictures. The encoded pictures can be, for example, predicted pictures (P), bi-predictive pictures (B), and/or intra-coded pictures (I). The intra-coded pictures can be decoded without using any other pictures, but other type of pictures need at least one reference picture before they can be decoded. Pictures of any of the above mentioned picture types can be used as a reference picture.

The encoder advantageously attaches two time stamps to the pictures: a decoding time stamp (DTS) and output time stamp (OTS). The decoder can use the time stamps to determine the correct decoding time and time to output (display) the pictures. However, those time stamps are not necessarily transmitted to the decoder or it does not use them.

Figure 6A:
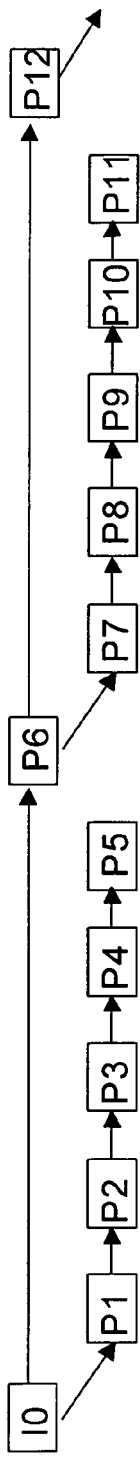
Figure 6B:
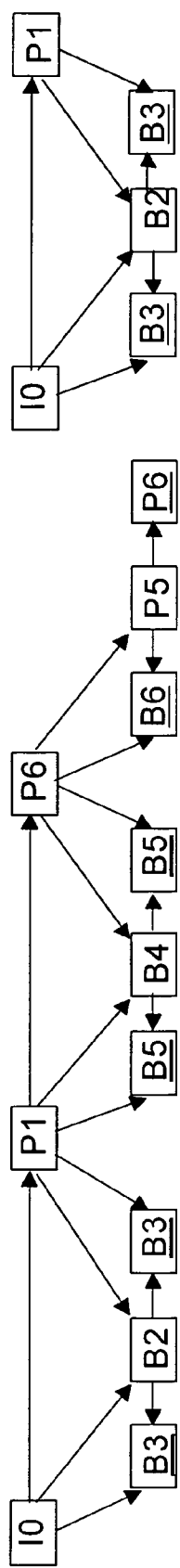
Figure 6C:
Figure 7:
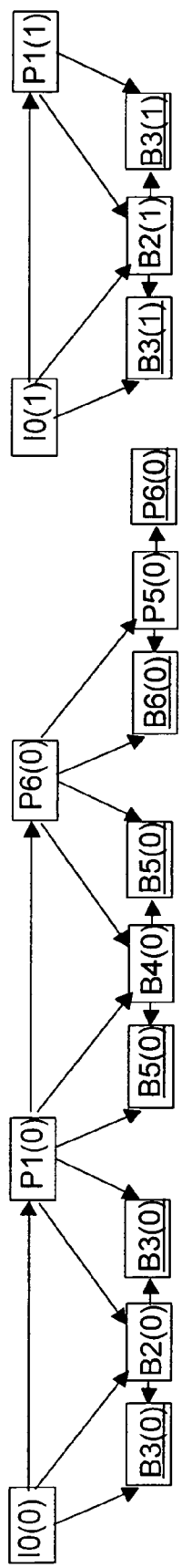

The encoder also forms sub-sequences on one or more layers above the lowest layer 0. The pictures on layer 0 are independently decodable, but the pictures on higher layers may depend on pictures on some lower layer or layers. In the example of FIG. 6a there are two layers: layer 0 and layer 1. The pictures I0, P6 and P12 belong to the layer 0 while other pictures P1–P5, P7–P11 shown on FIG. 6a belong to the layer 1. Advantageously, the encoder forms groups of pictures (GOP) so that each picture of one GOP can be reconstructed by using only the pictures in the same GOP. In other words, one GOP contains at least one independently decodable picture and all the other pictures for which the independently decodable picture is a reference picture. In the example of FIG. 7, there are two group of pictures. The first group of pictures includes the pictures I0(0), P1(0), P3(0) on layer 0, and pictures B2(0), 2xB3(0), B4(0), 2xB5(0), B6(0), P5(0), P6(0) on layer 1. The second group of pictures includes the pictures I0(1), and P1(1) on layer 0, and pictures 2xB3(1) and B2(1) on layer 1. The pictures on layer 1 of each group of pictures are further arranged as sub-sequences. The first sub-sequence of the first group of pictures contains pictures B3(0), B2(0), B3(0), the second sub-sequence contains pictures B5(0), B4(0), B5(0), and the third sub-sequence contains pictures B6(0), P5(0), P6(0). The sub-sequence of the second group of pictures contains pictures B3(1), B2(1), B3(1). The numbers in brackets indicate the video sequence ID defined for the group of pictures in which the picture belongs.

Figure 11A:
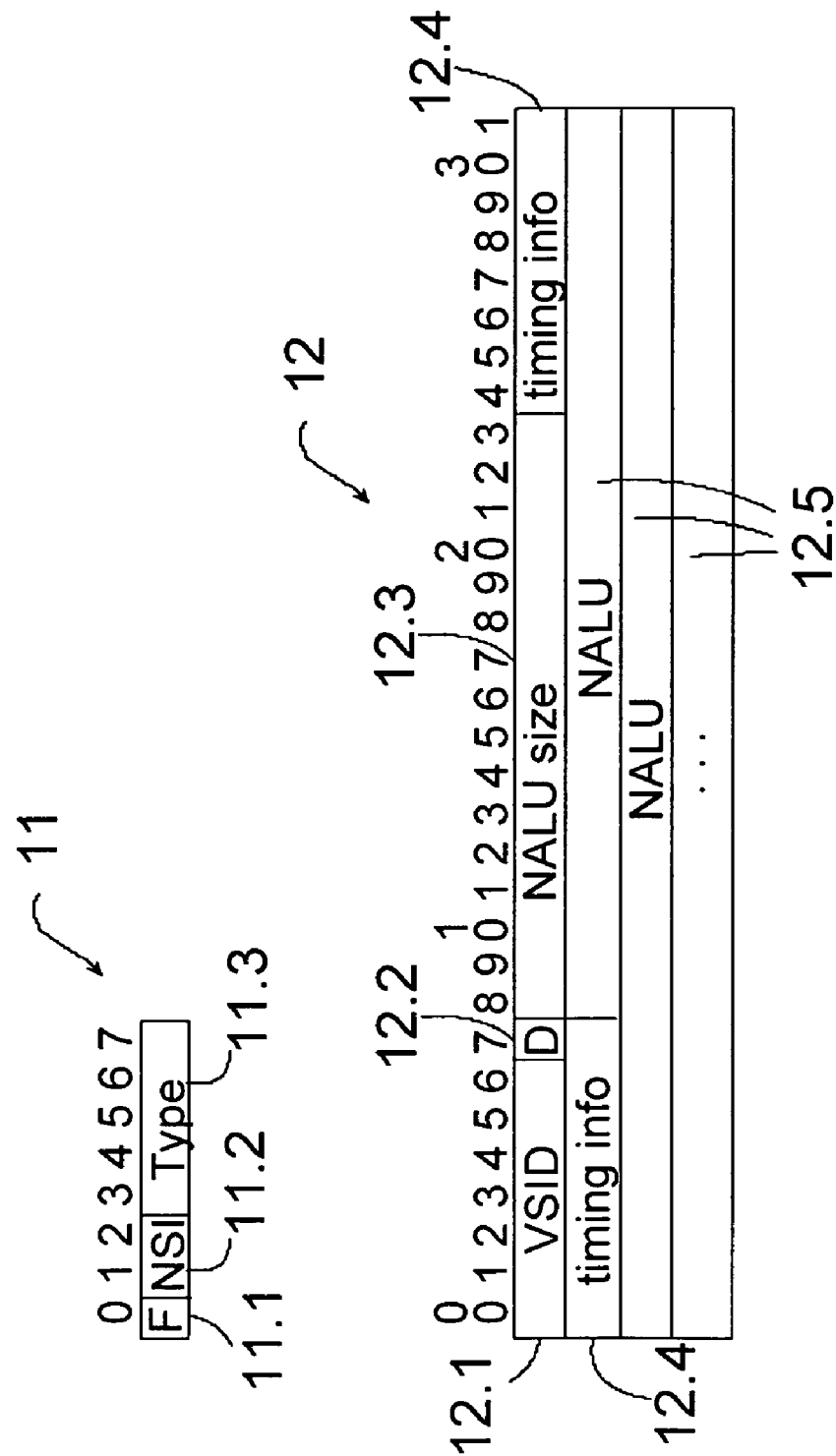
Figure 11B:
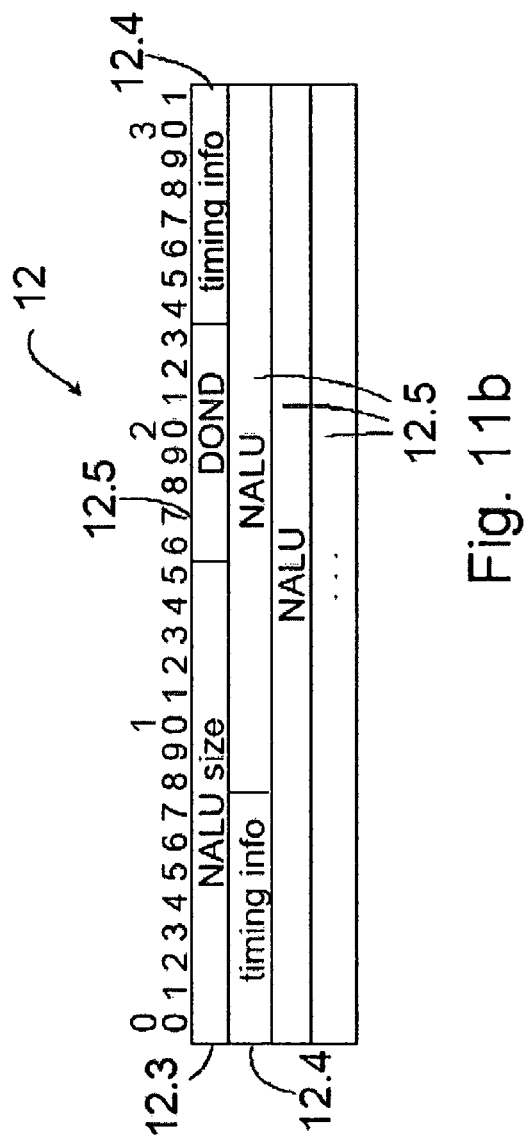

The video sequence ID is transferred for each picture. It can be conveyed within the video bitstream, such as in the Supplemental Enhancement Information data. The video sequence ID can also be transmitted in the header fields of the transport protocol, such as within the RTP payload header of the JVT coding standard. The video sequence ID according to the presented partitioning to independent GOPs can be stored in the metadata of the video file format, such as in the MPEG-4 AVC file format. FIGS. 11a and 11b disclose examples of the NAL packet formats which can be used with the present invention. The packet contains a header 11 and a payload part 12. The header 11 contains advantageously an error indicator field 11.1 (F, Forbidden), a priority field 11.2, and a type field 11.3. The error indicator field 11.1 indicates a bit error free NAL unit. Advantageously, when the error indicator field is set, the decoder is advised that bit errors may be present in the payload or in the NALU type octet. Decoders that are incapable of handling bit errors can then discard such packets. The priority field 11.2 is used for indicating the importance of the picture encapsulated in the payload part 12 of the packet. In an example implementation, the priority field can have four different values as follows. A value of 00 indicates that the content of the NALU is not used to reconstruct stored pictures (that can be used for future reference). Such NALUs can be discarded without risking the integrity of the reference pictures. Values above 00 indicate that the decoding of the NALU is required to maintain the integrity of the reference pictures. Furthermore, values above 00 indicate the relative transport priority, as determined by the encoder. Intelligent network elements can use this information to protect more important NALUs better than less important NALUs. 11 is the highest transport priority, followed by 10, then by 01 and, finally, 00 is the lowest.

The payload part 12 of the NALU contains at least a video sequence ID field 12.1, a field indicator 12.2, size field 12.3, timing info 12.4 and the encoded picture information 12.5. The video sequence ID field 12.1 is used for storing the number of the video sequence in which the picture belongs to. The field indicator 12.2 is used to signal whether the picture is a first or a second frame when two-frame picture format is used. Both frames may be coded as separate pictures. The first field indicator equal to 1 advantageously signals that the NALU belongs to a coded frame or a coded field that precedes the second coded field of the same frame in decoding order. The first field indicator equal to 0 signals that the NALU belongs to a coded field that succeeds the first coded field of the same frame in decoding order. The timing info field 11.3 is used for transforming time related information, if necessary.

The NAL units can be delivered in different kind of packets. In this advantageous embodiment the different packet formats include simple packets and aggregation packets. The aggregation packets can further be divided into single-time aggregation packets and multi-time aggregation packets.

A simple packet according to this invention consists of one NALU. A NAL unit stream composed by decapsulating Simple Packets in RTP sequence number order should conform to the NAL unit delivery order.

Aggregation packets are the packet aggregation scheme of this payload specification. The scheme is introduced to reflect the dramatically different MTU sizes of two different type of networks—wireline IP networks (with an MTU size that is often limited by the Ethernet MTU size—roughly 1500 bytes), and IP or non-IP (e.g. H.324/M) based wireless networks with preferred transmission unit sizes of 254 bytes or less. In order to prevent media transcoding between the two worlds, and to avoid undesirable packetization overhead, a packet aggregation scheme is introduced.

Single-Time Aggregation Packet (STAP) aggregate NALUs with identical NALU-time. Respectively, Multi-Time Aggregation Packets (MTAP) aggregate NALUs with potentially differing NALU-time. Two different MTAPs are defined that differ in the length of the NALU timestamp offset. The term NALU-time is defined as the value the RTP timestamp would have if that NALU would be transported in its own RTP packet.

MTAPs and STAP share the following non-limiting packetization rules according to an advantageous embodiment of the present invention. The RTP timestamp must be set to the minimum of the NALU times of all the NALUs to be aggregated. The Type field of the NALU type octet must be set to the appropriate value as indicated in table 1. The error indicator field 11.1 must be cleared if all error indicator fields of the aggregated NALUs are zero, otherwise it must be set.

TABLE 1

| Type | Packet | Timestamp offset field length(in bits) |
|------|--------|----------------------------------------|
| 0x18 | STAP   | 0                                      |
| 0x19 | MTAP16 | 16                                     |
| 0x20 | MTAP24 | 24                                     |

The NALU Payload of an aggregation packet consists of one or more aggregation units. An aggregation packet can carry as many aggregation units as necessary, however the total amount of data in an aggregation packet obviously must fit into an IP packet, and the size should be chosen such that the resulting IP packet is smaller than the MTU size.

Single-Time Aggregation Packet (STAP) should be used whenever aggregating NALUs that share the same NALU-time. The NALU payload of an STAP consists of the video sequence ID field 12.1 (e.g. 7 bits) and the field indicator 12.2 followed by Single-Picture Aggregation Units (SPAU).

In another alternative embodiment the NALU payload of an Single-Picture Aggregation Packet (STAP) consists of a 16-bit unsigned decoding order number (DON) followed by Single-Picture Aggregation Units (SPAU).

A video sequence according to this specification can be any part of NALU stream that can be decoded independently from other parts of the NALU stream.

A frame consists of two fields that may be coded as separate pictures. The first field indicator equal to 1 signals that the NALU belongs to a coded frame or a coded field that precedes the second coded field of the same frame in decoding order. The first field indicator equal to 0 signals that the NALU belongs to a coded field that succeeds the first coded field of the same frame in decoding order.

A Single-Picture Aggregation Unit consists of e.g. 16-bit unsigned size information that indicates the size of the following NALU in bytes (excluding these two octets, but including the NALU type octet of the NALU), followed by the NALU itself including its NALU type byte.

A Multi-Time Aggregation Packet (MTAP) has a similar architecture as an STAP. It consists of the NALU header byte and one or more Multi-Picture Aggregation Units. The choice between the different MTAP fields is application dependent—the larger the timestamp offset is the higher is the flexibility of the MTAP, but the higher is also the overhead.

Two different Multi-Time Aggregation Units are defined in this specification. Both of them consist of e.g. 16 bits unsigned size information of the following NALU (same as the size information of in the STAP). In addition to these 16 bits there are also the video sequence ID field 12.1 (e.g. 7 bits), the field indicator 12.2 and n bits of timing information for this NALU, whereby n can e.g. be 16 or 24. The timing information field has to be set so that the RTP timestamp of an RTP packet of each NALU in the MTAP (the NALU-time) can be generated by adding the timing information from the RTP timestamp of the MTAP.

In another alternative embodiment the Multi-Time Aggregation Packet (MTAP) consists of the NALU header byte, a decoding order number base (DONB) field 12.1 (e.g. 16 bits), and one or more Multi-Picture Aggregation Units. The two different Multi-Time Aggregation Units are in this case defined as follows. Both of them consist of e.g. 16 bits unsigned size information of the following NALU (same as the size information of in the STAP). In addition to these 16 bits there are also the decoding order number delta (DOND) field 12.5 (e.g. 7 bits), and n bits of timing information for this NALU, whereby n can e.g. be 16 or 24. DON of the following NALU is equal to DONB+DOND. The timing information field has to be set so that the RTP timestamp of an RTP packet of each NALU in the MTAP (the NALU-time) can be generated by adding the timing information from the RTP timestamp of the MTAP. DONB shall contain the smallest value of DON among the NAL units of the MTAP.

The behaviour of the buffering model according to the present invention is advantageously controlled with the following parameters: the initial input period (e.g. in clock ticks of a 90-kHz clock) and the size of the hypothetical packet input buffer (e.g. in bytes). Preferably, the default initial input period and the default size of the hypothetical packet input buffer are 0. PSS clients may signal their capability of providing a larger buffer in the capability exchange process.

The maximum video bit-rate can be signalled, for example, in the media-level bandwidth attribute of SDP, or in a dedicated SDP parameter. If the video-level bandwidth attribute was not present in the presentation description, the maximum video bit-rate is defined according to the video coding profile and level in use.

Initial parameter values for each stream can be signalled within the SDP description of the stream, for example using the MIME type parameters or similar non-standard SDP parameters. Signalled parameter values override the corresponding default parameter values. The values signalled within the SDP description guarantee pauseless playback from the beginning of the stream until the end of the stream (assuming a constant-delay reliable transmission channel).

PSS servers may update parameter values in the response for an RTSP PLAY request. If an updated parameter value is present, it shall replace the value signalled in the SDP description or the default parameter value in the operation of the PSS buffering model. An updated parameter value is valid only in the indicated playback range, and it has no effect after that. Assuming a constant-delay reliable transmission channel, the updated parameter values guarantee pauseless playback of the actual range indicated in the response for the PLAY request. The indicated size of the hypothetical input packet buffer and initial input period shall be smaller than or equal to the corresponding values in the SDP description or the corresponding default values, whichever ones are valid.

The server buffering verifier is specified according to the specified buffering model. The model is based on a hypothetical packet input buffer.

The buffering model is presented next. The buffer is initially empty. A PSS Server adds each transmitted RTP packet having video payload to the hypothetical packet input buffer 1.1 immediately when it is transmitted. All protocol headers at RTP or any lower layer are removed. Data is not removed from the hypothetical packet input buffer during a period called the initial input period. The initial input period starts when the first RTP packet is added to the hypothetical packet input buffer. When the initial input period has expired, removal of data from the hypothetical packet input buffer is started. Data removal happens advantageously at the maximum video bit-rate, unless the hypothetical packet input buffer 1.1 is empty. Data removed from the hypothetical packet input buffer 1.1 is input to the Hypothetical Reference Decoder 5. The hypothetical reference decoder 5 performs the hypothetical decoding process to ensure that the encoded video stream is decodable according to the set parameters, or if the hypothetical reference decoder 5 notices that e.g. the picture buffer 5.2 of the hypothetical reference decoder 5 overflows, the buffer parameters can be modified. In that case the new parameters are also transmitted to the receiving device 8, in which the buffers are re-initialized accordingly.

The encoding and transmitting device 1, such as a PSS server, shall verify that a transmitted RTP packet stream complies with the following requirements:

The buffering model shall be used with the default or signalled buffering parameter values. Signalled parameter values override the corresponding default parameter values.

The occupancy of the hypothetical packet input buffer shall not exceed the default or signalled buffer size.

The output bitstream of the hypothetical packet input buffer shall conform to the definitions of the Hypothetical Reference Decoder.

When the buffering model is in use, the PSS client shall be capable of receiving an RTP packet stream that complies with the PSS server buffering verifier, when the RTP packet stream is carried over a constant-delay reliable transmission channel. Furthermore, the decoder of the PSS client shall output frames at the correct rate defined by the RTP time-stamps of the received packet stream.

Transmission

The transmission and/or storing of the encoded pictures (and the optional virtual decoding) can be started immediately after the first encoded picture is ready. This picture is not necessarily the first one in decoder output order because the decoding order and the output order may not be the same.

When the first picture of the video stream is encoded the transmission can be started. The encoded pictures are optionally stored to the encoded picture buffer 1.2. The transmission can also start at a later stage, for example, after a certain part of the video stream is encoded.

The decoder 2 should also output the decoded pictures in correct order, for example by using the ordering of the picture order counts, and hence the reordering process need be defined clearly and normatively.

De-Packetizinq

The de-packetization process is implementation dependent. Hence, the following description is a non-restrictive example of a suitable implementation.

Other schemes may be used as well. Optimizations relative to the described algorithms are likely possible.

The general concept behind these de-packetization rules is to reorder NAL units from transmission order to the NAL unit delivery order.

Decoding

Next, the operation of the receiver 8 will be described. The receiver 8 collects all packets belonging to a picture, bringing them into a reasonable order. The strictness of the order depends on the profile employed. The received packets are stored into the receiving buffer 9.1 (pre-decoding buffer). The receiver 8 discards anything that is unusable, and passes the rest to the decoder 2. Aggregation packets are handled by unloading their payload into individual RTP packets carrying NALUs. Those NALUs are processed as if they were received in separate RTP packets, in the order they were arranged in the Aggregation Packet.

Hereinafter, let N be the value of the optional num-reorder-VCL-NAL-units MIME type parameter which specifies the maximum amount of VCL NAL units that precede any VCL NAL unit in the packet stream in NAL unit delivery order and follow the VCL NAL unit in RTP sequence number order or in the composition order of the aggregation packet containing the VCL NAL unit. If the parameter is not present, a 0 value number could be implied.

When the video stream transfer session is initialized, the receiver 8 allocates memory for the receiving buffer 9.1 for storing at least N pieces of VCL NAL units. The receiver then starts to receive the video stream and stores the received VCL NAL units into the receiving buffer, until at least N pieces of VCL NAL units are stored into the receiving buffer 9.1.

When the receiver buffer 9.1 contains at least N VCL NAL units, NAL units are removed from the receiver buffer 9.1 one by one and passed to the decoder 2. The NAL units are not necessarily removed from the receiver buffer 9.1 in the same order in which they were stored, but according to the video sequence ID of the NAL units, as described below. The delivery of the packets to the decoder 2 is continued until the buffer contains less than N VCL NAL units, i.e. N−1 VCL NAL units.

Figure 12:
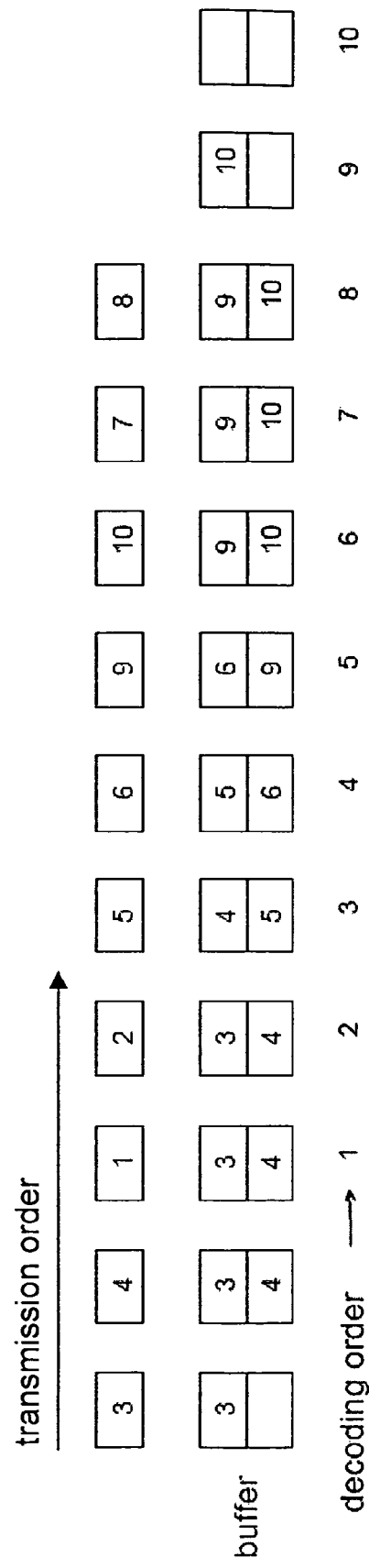
FIG. 12 depicts an example of buffering of transmission units in a predecoder buffer.

In FIG. 12 an example of buffering the transmission units in the predecoder buffer of the decoder is depicted. The numbers refer to the decoding order while the order of the transmission units refer to the transmission order (and also to the receiving order).

Hereinafter, let PVSID be the video sequence ID (VSID) of the latest NAL unit passed to the decoder. All NAL units in a STAP share the same VSID. The order that NAL units are passed to the decoder is specified as follows: If the oldest RTP sequence number in the buffer corresponds to a Simple Packet, the NALU in the Simple Packet is the next NALU in the NAL unit delivery order. If the oldest RTP sequence number in the buffer corresponds to an Aggregation Packet, the NAL unit delivery order is recovered among the NALUs conveyed in Aggregation Packets in RTP sequence number order until the next Simple Packet (exclusive). This set of NALUs is hereinafter referred to as the candidate NALUs. If no NALUs conveyed in Simple Packets reside in the buffer, all NALUs belong to candidate NALUs.

For each NAL unit among the candidate NALUs, a VSID distance is calculated as follows. If the VSID of the NAL unit is larger than PVSID, the VSID distance is equal to VSID−PVSID. Otherwise, the VSID distance is equal to 2^(number of bits used to signal VSID)−PVSID+VSID. NAL units are delivered to the decoder in ascending order of VSID distance. If several NAL units share the same VSID distance, the order to pass them to the decoder shall conform to the NAL unit delivery order defined in this specification. The NAL unit delivery order can be recovered as described in the following.

First, slices and data partitions are associated with pictures according to their frame numbers, RTP timestamps and first field flags: all NALUs sharing the same values of the frame number, the RTP timestamp and the first field flag belong to the same picture. SEI NALUs, sequence parameter set NALUs, picture parameter set NALUs, picture delimiter NALUs, end of sequence NALUs, end of stream NALUs, and filler data NALUs belong to the picture of the next VCL NAL unit in transmission order.

Second, the delivery order of the pictures is concluded based on nal_ref_idc, the frame number, the first field flag, and the RTP timestamp of each picture. The delivery order of pictures is in ascending order of frame numbers (in modulo arithmetic). If several pictures share the same value of frame number, the picture(s) that have nal_ref_idc equal to 0 are delivered first. If several pictures share the same value of frame number and they all have nal_ref_idc equal to 0, the pictures are delivered in ascending RTP timestamp order. If two pictures share the same RTP timestamp, the picture having first field flag equal to 1 is delivered first. Note that a primary coded picture and the corresponding redundant coded pictures are herein considered as one coded picture.

Third, if the video decoder in use does not support Arbitrary Slice Ordering, the delivery order of slices and A data partitions is in ascending order of the first_mb_in_slice syntax element in the slice header. Moreover, B and C data partitions immediately follow the corresponding A data partition in delivery order.

In the above the terms PVSID and VSID were used. Terms PDON (the decoding order number of the previous NAL unit of an aggregation packet in NAL unit delivery order) and DON (decoding order number) can be used instead as follows: Let PDON of the first NAL unit passed to the decoder be 0. The order that NAL units are passed to the decoder is specified as follows: If the oldest RTP sequence number in the buffer corresponds to a Simple Packet, the NALU in the Simple Packet is the next NALU in the NAL unit delivery order. If the oldest RTP sequence number in the buffer corresponds to an Aggregation Packet, the NAL unit delivery order is recovered among the NALUs conveyed in Aggregation Packets in RTP sequence number order until the next Simple Packet (exclusive). This set of NALUs is hereinafter referred to as the candidate NALUs. If no NALUs conveyed in Simple Packets reside in the buffer, all NALUs belong to candidate NALUs.

For each NAL unit among the candidate NALUs, a DON distance is calculated as follows. If the DON of the NAL unit is larger than PDON, the DON distance is equal to DON−PDON. Otherwise, the DON distance is equal to 2^(number of bits to represent an DON and PDON as an unsigned integer)−PDON+DON. NAL units are delivered to the decoder in ascending order of DON distance.

If several NAL units share the same DON distance, the order to pass them to the decoder is:
1. Picture delimiter NAL unit, if any
2. Sequence parameter set NAL units, if any
3. Picture parameter set NAL units, if any
4. SEI NAL units, if any
5. Coded slice and slice data partition NAL units of the primary coded picture, if any
6. Coded slice and slice data partition NAL units of the redundant coded pictures, if any
7. Filler data NAL units, if any
8. End of sequence NAL unit, if any
9. End of stream NAL unit, if any.

If the video decoder in use does not support Arbitrary Slice Ordering, the delivery order of slices and A data partitions is ordered in ascending order of the first_mb_in_slice syntax element in the slice header. Moreover, B and C data partitions immediately follow the corresponding A data partition in delivery order.

The following additional de-packetization rules may be used to implement an operational JVT de-packetizer: NALUs are presented to the JVT decoder in the order of the RTP sequence number. NALUs carried in an Aggregation Packet are presented in their order in the Aggregation packet. All NALUs of the Aggregation packet are processed before the next RTP packet is processed.

Intelligent RTP receivers (e.g. in Gateways) may identify lost DPAs. If a lost DPA is found, the Gateway MAY decide not to send the DPB and DPC partitions, as their information is meaningless for the JVT Decoder. In this way a network element can reduce network load by discarding useless packets, without parsing a complex bit stream.

Intelligent receivers may discard all packets that have a NAL Reference Idc of 0. However, they should process those packets if possible, because the user experience may suffer if the packets are discarded.

The DPB 2.1 contains memory places for storing a number of pictures. Those places are also called as frame stores in the description. The decoder 2 decodes the received pictures in correct order. To do so the decoder examines the video sequence ID information of the received pictures. If the encoder has selected the video sequence ID for each group of pictures freely, the decoder decodes the pictures of the group of pictures in the order in which they are received. If the encoder has defined for each group of pictures the video sequence ID by using incrementing (or decrementing) numbering scheme, the decoder decodes the group of pictures in the order of video sequence IDs. In other words, the group of pictures having the smallest (or biggest) video sequence ID is decoded first.

The present invention can be applied in many kind of systems and devices. The transmitting device 6 including the encoder 1 and optionally the HRD 5 advantageously include also a transmitter 7 to transmit the encoded pictures to the transmission channel 4. The receiving device 8 include the receiver 9 to receive the encoded pictures, the decoder 2, and a display 10 on which the decoded pictures can be displayed. The transmission channel can be, for example, a landline communication channel and/or a wireless communication channel. The transmitting device and the receiving device include also one or more processors 1.2, 2.2 which can perform the necessary steps for controlling the encoding/decoding process of video stream according to the invention. Therefore, the method according to the present invention can mainly be implemented as machine executable steps of the processors. The buffering of the pictures can be implemented in the memory 1.3, 2.3 of the devices. The program code 1.4 of the encoder can be stored into the memory 1.3. Respectively, the program code 2.4 of the decoder can be stored into the memory 2.3.

It is obvious that the hypothetical reference decoder 5 can be situated after the encoder 1, so that the hypothetical reference decoder 5 rearranges the encoded pictures, if necessary, and can ensure that the pre-decoding buffer of the receiver 8 does not overflow.

The present invention can be implemented in the buffering verifier which can be part of the hypothetical reference decoder 5 or it can be separate from it.

What is claimed is:

1. A method comprising:
   encapsulating, by an encoder, media data as data transmission units, the data transmission units being ordered in a transmission order which is at least partly different from a decoding order of the media data in the data transmission units,
   defining a size of a buffer corresponding to a maximum occupancy of the buffer, wherein the maximum occupancy is determined according to a buffering algorithm for arranging the data transmission units from the transmission order to the decoding order, wherein
   according to the buffering algorithm, data transmission units are stored into a pre-decoding buffer until the pre-decoding buffer has a number of transmission units indicated by an interleaving depth value and data transmission units are removed from the pre-decoding buffer according to a number indicating the decoding order.

2. The method according to claim 1, wherein media data is video according to H.264/AVC and data transmission units are network abstraction layer units of H.264/AVC.

3. The method according to claim 1, wherein the size of the buffer is sufficiently large in bytes for holding the data transmission units according to the buffering algorithm.

4. A system comprising:
   a first apparatus comprising an encoder configured to encapsulate media data as data transmission units, the data transmission units being ordered in a transmission order which is at least partly different from a decoding order of the media data in the data transmission units, and configured to define a size of a buffer corresponding to a maximum occupancy of a pre-decoding buffer, wherein the maximum occupancy is determined according to a buffering algorithm for arranging the data transmission units from the transmission order to the decoding order,
   a second apparatus configured to, according to the buffering algorithm, store data transmission units into a pre-decoding buffer until the pre-decoding buffer has a number of transmission units indicated by an interleaving depth value and remove data transmission units from the pre-decoding buffer according to a number indicating the decoding order.

5. The system according to claim 4, the second apparatus further comprising a buffer configured to buffer the encoded media data, and the first apparatus comprising a hypothetical reference decoder configured to determine buffering requirements for decoding of the media data.

6. An apparatus configured to encapsulate media data for transmission comprising:
   an encoder configured to encapsulate said media data as data transmission units for transmission to a decoding apparatus, the data transmission units configured to be buffered for arranging the data transmission units in decoding order and to be decoded, the data transmission units being ordered in a transmission order which is at least partly different from a decoding order of the media data in the data transmission units,
   a processor and at least one memory including program code, the at least one memory and the program code configured to, with the processor, cause the apparatus at least to:
   define a size of a buffer corresponding to a maximum occupancy of the buffer, wherein the maximum occupancy is determined according to a buffering algorithm for arranging the data transmission units from the transmission order to the decoding order, and wherein according to the buffering algorithm the data transmission units are stored into the buffer in a transmission order until the buffer has a number of transmission units indicated by an interleaving depth value and removed from the buffer according to a number indicating the decoding order; and
   transmit the size of the buffer to the decoding apparatus.

7. The apparatus according to claim 6, wherein the at least one memory and the program code are configured to define the size of the buffer so that the size of the buffer is sufficiently large in bytes for holding the data transmission units according to the buffering algorithm.

8. The apparatus according to claim 6, further comprising a buffer configured to buffer the encoded media data, and a hypothetical reference decoder configured to determine buffering requirements for decoding of the encoded media data.

9. The apparatus according to claim 6, wherein media data is video according to H.264/AVC and data transmission units are network abstraction layer units of H.264/AVC.

10. A decoder configured to decode data transmission units comprising encoded media data, comprising:
    a pre-decoding buffer configured to receive the data transmission units comprising the encoded media data and to arrange data transmission units in decoding order; and
    a processor configured to allocate memory for the pre-decoding buffer according to a received parameter indicative of a size of the pre-decoding buffer,
    wherein the size of the pre-decoding buffer is defined to correspond to a maximum occupancy of the pre-decoding buffer according to a buffering algorithm for arranging the data transmission units in the decoding order, and wherein the decoder is configured to, according to the buffering algorithm, store data transmission units into the pre-decoding buffer until the pre-decoding buffer has a number of transmission units indicated by an interleaving depth value and remove data transmission units from the pre-decoding buffer according to a number indicating the decoding order.

11. The decoder according to claim 10, wherein the processor is configured to allocate memory for the buffer according to the received parameter so that the size of the buffer is sufficiently large in bytes for holding the data transmission units according to the buffering algorithm.

12. A processor readable memory stored with executable instructions for decoding data transmission units comprising encoded media data, which when executed by a processor causes:

to allocate memory for a pre-decoding buffer according to a received parameter indicative of a size of the pre-decoding buffer, wherein the size of the pre-decoding buffer is defined to correspond to a maximum occupancy of the pre-decoding buffer according to a buffering algorithm for arranging the data transmission units in a decoding order; and to receive the data transmission units comprising the encoded media data into the pre-decoding buffer and to arrange data transmission units in decoding order; according to the buffering algorithm, to store data transmission units into the pre-decoding buffer until the pre-decoding buffer has a number of transmission units indicated by an interleaving depth value and remove data transmission units from the pre-decoding buffer according to a number indicating the decoding order.

* * * * *